US008886103B2

(12) United States Patent
Yamaji et al.

(10) Patent No.: US 8,886,103 B2
(45) Date of Patent: Nov. 11, 2014

(54) FIXING DEVICE CAPABLE OF MINIMIZING DAMAGE OF ENDLESS BELT AND IMAGE FORMING APPARATUS INCORPORATING SAME

(71) Applicants: Kensuke Yamaji, Kanagawa (JP); Masahiko Satoh, Tokyo (JP); Masaaki Yoshikawa, Tokyo (JP); Hiroshi Yoshinaga, Chiba (JP); Kenji Ishii, Kanagawa (JP); Tadashi Ogawa, Tokyo (JP); Takeshi Uchitani, Kanagawa (JP); Hiromasa Takagi, Tokyo (JP); Naoki Iwaya, Tokyo (JP); Teppei Kawata, Kanagawa (JP); Arinobu Yoshiura, Kanagawa (JP); Takahiro Imada, Kanagawa (JP); Hajime Gotoh, Kanagawa (JP); Takamasa Hase, Shizuoka (JP); Kazuya Saito, Kanagawa (JP); Toshihiko Shimokawa, Kanagawa (JP); Shuutaroh Yuasa, Kanagawa (JP); Akira Suzuki, Tokyo (JP)

(72) Inventors: Kensuke Yamaji, Kanagawa (JP); Masahiko Satoh, Tokyo (JP); Masaaki Yoshikawa, Tokyo (JP); Hiroshi Yoshinaga, Chiba (JP); Kenji Ishii, Kanagawa (JP); Tadashi Ogawa, Tokyo (JP); Takeshi Uchitani, Kanagawa (JP); Hiromasa Takagi, Tokyo (JP); Naoki Iwaya, Tokyo (JP); Teppei Kawata, Kanagawa (JP); Arinobu Yoshiura, Kanagawa (JP); Takahiro Imada, Kanagawa (JP); Hajime Gotoh, Kanagawa (JP); Takamasa Hase, Shizuoka (JP); Kazuya Saito, Kanagawa (JP); Toshihiko Shimokawa, Kanagawa (JP); Shuutaroh Yuasa, Kanagawa (JP); Akira Suzuki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 111 days.

(21) Appl. No.: 13/746,677

(22) Filed: Jan. 22, 2013

(65) Prior Publication Data

US 2013/0209146 A1 Aug. 15, 2013

(30) Foreign Application Priority Data

Feb. 9, 2012 (JP) ................................ 2012-026219
Feb. 27, 2012 (JP) ................................ 2012-040117

(51) Int. Cl.
*G03G 15/20* (2006.01)
*B65G 21/20* (2006.01)

(52) U.S. Cl.
USPC .......................................... 399/329; 198/840

(58) Field of Classification Search
CPC ................. G03G 15/755; G03G 2215/00143; G03G 2215/00151; G03G 2215/2016; B65G 21/22; B65G 39/16; B65G 39/071
USPC .......... 399/165, 302, 303, 312, 329; 198/840; 219/216; 474/122, 140
See application file for complete search history.

(56) References Cited

U.S. PATENT DOCUMENTS 5,219,063 A * 6/1993 Wyatt ............................ 198/840
5,300,996 A 4/1994 Yokoyama et al.
5,573,104 A * 11/1996 Kibayashi et al. ............ 198/840
5,832,354 A 11/1998 Kouno et al.
RE36,124 E 3/1999 Yokoyama et al.
5,915,147 A 6/1999 Kouno et al.
6,002,908 A * 12/1999 Hayashi et al. ............... 399/312
6,088,558 A * 7/2000 Yamada et al. ............... 399/165
6,636,709 B2 10/2003 Furukawa et al.
6,912,371 B2 * 6/2005 Sato ............................. 399/329
7,643,782 B2 * 1/2010 Ishii et al. ..................... 399/302
7,831,165 B2 * 11/2010 Segawa .......................... 399/69
2002/0067936 A1 6/2002 Yasui et al.
2003/0000933 A1 1/2003 Yoshinaga et al.
2003/0016963 A1 1/2003 Yoshinaga et al.
2003/0206758 A1 11/2003 Yasui et al.
2004/0013453 A1 1/2004 Shinshi et al.
2004/0247334 A1 12/2004 Kishi et al.

| | | | |
|---|---|---|---|
| 2004/0258426 | A1 | 12/2004 | Kishi et al. |
| 2005/0025539 | A1 | 2/2005 | Yoshinaga |
| 2005/0074251 | A1 | 4/2005 | Katoh et al. |
| 2005/0095043 | A1 | 5/2005 | Yoshinaga et al. |
| 2005/0129432 | A1 | 6/2005 | Sato et al. |
| 2005/0163543 | A1 | 7/2005 | Satoh et al. |
| 2006/0051120 | A1 | 3/2006 | Kishi et al. |
| 2006/0116230 | A1 | 6/2006 | Satoh et al. |
| 2006/0165429 | A1 | 7/2006 | Satoh et al. |
| 2006/0165448 | A1 | 7/2006 | Yoshinaga |
| 2006/0177232 | A1 | 8/2006 | Ehara et al. |
| 2006/0182460 | A1 | 8/2006 | Kishi et al. |
| 2006/0285893 | A1 | 12/2006 | Ishii |
| 2007/0014600 | A1 | 1/2007 | Ishii et al. |
| 2007/0014603 | A1 | 1/2007 | Satoh et al. |
| 2007/0059011 | A1 | 3/2007 | Seo et al. |
| 2007/0059071 | A1 | 3/2007 | Shinshi et al. |
| 2007/0110464 | A1 | 5/2007 | Nakayama et al. |
| 2007/0212089 | A1 | 9/2007 | Seo et al. |
| 2007/0280754 | A1 | 12/2007 | Ogawa et al. |
| 2007/0292175 | A1 | 12/2007 | Shinshi |
| 2008/0044196 | A1 | 2/2008 | Seo et al. |
| 2008/0063443 | A1 | 3/2008 | Yoshinaga et al. |
| 2008/0253789 | A1 | 10/2008 | Yoshinaga et al. |
| 2008/0317532 | A1 | 12/2008 | Ehara et al. |
| 2009/0067902 | A1 | 3/2009 | Yoshinaga et al. |
| 2009/0123201 | A1 | 5/2009 | Ehara et al. |
| 2009/0123202 | A1 | 5/2009 | Yoshinaga et al. |
| 2009/0148204 | A1 | 6/2009 | Yoshinaga et al. |
| 2009/0169232 | A1 | 7/2009 | Kunii et al. |
| 2009/0245865 | A1 | 10/2009 | Shinshi et al. |
| 2010/0074667 | A1 | 3/2010 | Ehara et al. |
| 2010/0092220 | A1 | 4/2010 | Hasegawa et al. |
| 2010/0092221 | A1 | 4/2010 | Shinshi et al. |
| 2010/0202809 | A1 | 8/2010 | Shinshi et al. |
| 2010/0290822 | A1 | 11/2010 | Hasegawa et al. |
| 2011/0026988 | A1 | 2/2011 | Yoshikawa et al. |
| 2011/0044706 | A1 | 2/2011 | Iwaya et al. |
| 2011/0044734 | A1 | 2/2011 | Shimokawa et al. |
| 2011/0052237 | A1 | 3/2011 | Yoshikawa et al. |
| 2011/0052282 | A1 | 3/2011 | Shinshi et al. |
| 2011/0058862 | A1 | 3/2011 | Yamaguchi et al. |
| 2011/0058863 | A1 | 3/2011 | Shinshi et al. |
| 2011/0058864 | A1 | 3/2011 | Fujimoto et al. |
| 2011/0058865 | A1 | 3/2011 | Tokuda et al. |
| 2011/0058866 | A1 | 3/2011 | Ishii et al. |
| 2011/0064437 | A1 | 3/2011 | Yamashina et al. |
| 2011/0064443 | A1 | 3/2011 | Iwaya et al. |
| 2011/0064450 | A1 | 3/2011 | Ishii et al. |
| 2011/0064490 | A1 | 3/2011 | Imada et al. |
| 2011/0076071 | A1 | 3/2011 | Yamaguchi et al. |
| 2011/0085832 | A1 | 4/2011 | Hasegawa et al. |
| 2011/0091253 | A1 | 4/2011 | Seo et al. |
| 2011/0116848 | A1 | 5/2011 | Yamaguchi et al. |
| 2011/0129268 | A1 | 6/2011 | Ishii et al. |
| 2011/0170917 | A1 | 7/2011 | Yoshikawa et al. |
| 2011/0182634 | A1 | 7/2011 | Ishigaya et al. |
| 2011/0182638 | A1 | 7/2011 | Ishii et al. |
| 2011/0194869 | A1 | 8/2011 | Yoshinaga et al. |
| 2011/0194870 | A1 | 8/2011 | Hase et al. |
| 2011/0200368 | A1 | 8/2011 | Yamaguchi et al. |
| 2011/0200370 | A1 | 8/2011 | Ikebuchi et al. |
| 2011/0206427 | A1 | 8/2011 | Iwaya et al. |
| 2011/0217056 | A1 | 9/2011 | Yoshinaga et al. |
| 2011/0217057 | A1 | 9/2011 | Yoshinaga et al. |
| 2011/0217093 | A1 | 9/2011 | Tokuda et al. |
| 2011/0217095 | A1 | 9/2011 | Ishii et al. |
| 2011/0222875 | A1 | 9/2011 | Imada et al. |
| 2011/0222888 | A1 | 9/2011 | Ikebuchi et al. |
| 2011/0222929 | A1 | 9/2011 | Fujimoto et al. |
| 2011/0222930 | A1 | 9/2011 | Fujimoto et al. |
| 2011/0222931 | A1 | 9/2011 | Shinshi et al. |
| 2011/0229161 | A1 | 9/2011 | Ueno et al. |
| 2011/0229180 | A1 | 9/2011 | Saito |
| 2011/0229181 | A1 | 9/2011 | Iwaya et al. |
| 2011/0229200 | A1 | 9/2011 | Yamaguchi et al. |
| 2011/0229225 | A1 | 9/2011 | Ishii et al. |
| 2011/0229226 | A1 | 9/2011 | Tokuda et al. |
| 2011/0229227 | A1 | 9/2011 | Yoshikawa et al. |
| 2011/0229228 | A1 | 9/2011 | Yoshikawa et al. |
| 2011/0274453 | A1 | 11/2011 | Shimokawa et al. |
| 2011/0286758 | A1 | 11/2011 | Yoshinaga |
| 2011/0293309 | A1 | 12/2011 | Hase |
| 2011/0311284 | A1 | 12/2011 | Seo et al. |
| 2012/0045226 | A1 | 2/2012 | Hase et al. |
| 2012/0051766 | A1 | 3/2012 | Ueno et al. |
| 2012/0051774 | A1 | 3/2012 | Ikebuchi et al. |
| 2012/0093531 | A1 | 4/2012 | Yuasa et al. |
| 2012/0093551 | A1 | 4/2012 | Ogawa et al. |
| 2012/0107005 | A1 | 5/2012 | Hase et al. |
| 2012/0114345 | A1 | 5/2012 | Fujimoto et al. |
| 2012/0114354 | A1 | 5/2012 | Saito et al. |
| 2012/0121303 | A1 | 5/2012 | Takagi et al. |
| 2012/0121304 | A1 | 5/2012 | Tokuda et al. |
| 2012/0121305 | A1 | 5/2012 | Yoshikawa et al. |
| 2012/0148303 | A1 | 6/2012 | Yamaguchi et al. |
| 2012/0155935 | A1 | 6/2012 | Yoshikawa et al. |
| 2012/0155936 | A1 | 6/2012 | Yamaguchi et al. |
| 2012/0177388 | A1 | 7/2012 | Imada et al. |
| 2012/0177393 | A1 | 7/2012 | Ikebuchi et al. |
| 2012/0177420 | A1 | 7/2012 | Shimokawa et al. |
| 2012/0177423 | A1 | 7/2012 | Imada et al. |
| 2012/0177424 | A1 | 7/2012 | Saito et al. |
| 2012/0207523 | A1 | 8/2012 | Ueno et al. |
| 2012/0219312 | A1 | 8/2012 | Yuasa et al. |
| 2012/0224878 | A1 | 9/2012 | Ikebuchi et al. |
| 2012/0237273 | A1 | 9/2012 | Yoshinaga et al. |
| 2013/0164056 | A1 * | 6/2013 | Imada et al. .................. 399/329 |
| 2013/0177340 | A1 * | 7/2013 | Kawata et al. ................ 399/329 |

FOREIGN PATENT DOCUMENTS

| | | | | |
|---|---|---|---|---|
| JP | 2000130523 | A | * | 5/2000 |
| JP | 2002182482 | A | * | 6/2002 |
| JP | 2006-293225 | | | 10/2006 |
| JP | 2007079464 | A | * | 3/2007 |
| JP | 2007-233011 | | | 9/2007 |
| JP | 2007-334205 | | | 12/2007 |
| JP | 2009134172 | A | * | 6/2009 |
| JP | 2009237186 | A | * | 10/2009 |
| JP | 2009237189 | A | * | 10/2009 |
| JP | 2009-288284 | | | 12/2009 |

OTHER PUBLICATIONS

U.S. Appl. No. 13/557,841, filed Jul. 25, 2012, Toshihiko Shimokawa, et al.

U.S. Appl. No. 13/608,128, filed Sep. 10, 2012, Shuutaroh Yuasa, et al.

* cited by examiner

*Primary Examiner* — Robert Beatty

(74) *Attorney, Agent, or Firm* — Oblon, Spivak, McClelland, Maier & Neustadt, L.L.P.

(57) ABSTRACT

A fixing device includes an endless belt and a belt holder contacting and rotatably supporting each lateral end of the endless belt in an axial direction thereof. A first protection ring and a second protection ring are interposed between the endless belt and the belt holder in the axial direction of the endless belt and rotatable in accordance with rotation of the endless belt to protect each lateral end of the endless belt as the endless belt is skewed in the axial direction thereof and brought into contact with the first protection ring. A friction coefficient between the first protection ring and the second protection ring is smaller than a friction coefficient between the first protection ring and the endless belt.

20 Claims, 10 Drawing Sheets

FIXING DEVICE CAPABLE OF MINIMIZING DAMAGE OF ENDLESS BELT AND IMAGE FORMING APPARATUS INCORPORATING SAME

CROSS-REFERENCE TO RELATED APPLICATIONS

This patent application is based on and claims priority pursuant to 35 U.S.C. §119 to Japanese Patent Application Nos. 2012-026219, filed on Feb. 9, 2012, and 2012-040117, filed on Feb. 27, 2012, in the Japanese Patent Office, the entire disclosure of each of which is hereby incorporated by reference herein.

BACKGROUND OF THE INVENTION

1. Field of the Invention

Exemplary aspects of the present invention relate to a fixing device and an image forming apparatus, and more particularly, to a fixing device for fixing a toner image on a recording medium and an image forming apparatus incorporating the fixing device.

2. Description of the Related Art

Related-art image forming apparatuses, such as copiers, facsimile machines, printers, or multifunction printers having at least one of copying, printing, scanning, and facsimile functions, typically form an image on a recording medium according to image data. Thus, for example, a charger uniformly charges a surface of a photoconductor; an optical writer emits a light beam onto the charged surface of the photoconductor to form an electrostatic latent image on the photoconductor according to the image data; a development device supplies toner to the electrostatic latent image formed on the photoconductor to render the electrostatic latent image visible as a toner image; the toner image is directly transferred from the photoconductor onto a recording medium or is indirectly transferred from the photoconductor onto a recording medium via an intermediate transfer belt; finally, a fixing device applies heat and pressure to the recording medium bearing the toner image to fix the toner image on the recording medium, thus forming the image on the recording medium.

Such fixing device is requested to shorten a first print time taken to output the recording medium bearing the toner image onto the outside of the image forming apparatus after the image forming apparatus receives a print job. Additionally, the fixing device is requested to generate a sufficient amount of heat even when a plurality of recording media is conveyed through the fixing device continuously at increased speed for high speed printing.

To address these requests, the fixing device may employ a thin endless belt having a decreased thermal capacity and therefore heated quickly by a heater. FIG. 1 illustrates such fixing device 20R1 that incorporates a thin endless belt 100. For example, as shown in FIG. 1, a pressing roller 400 is pressed against a substantially tubular, metal thermal conductor 200 disposed inside a loop formed by the endless belt 100 to form a fixing nip N between the pressing roller 400 and the endless belt 100. A heater 300 disposed inside the metal thermal conductor 200 heats the endless belt 100 via the metal thermal conductor 200. As the pressing roller 400 and the endless belt 100 rotate and convey a recording medium P bearing a toner image T through the fixing nip N in a recording medium conveyance direction A1, the endless belt 100 and the pressing roller 400 apply heat and pressure to the recording medium P, thus fixing the toner image T on the recording medium P. Since the heater 300 heats the endless belt 100 via the metal thermal conductor 200 that faces the entire inner circumferential surface of the endless belt 100, the endless belt 100 is heated to a predetermined fixing temperature quickly, thus meeting the above-described requests of shortening the first print time and generating heat sufficiently.

However, in order to shorten the first print time further and save more energy, the fixing device is requested to heat the endless belt 100 more efficiently. To address this request, a configuration to heat the endless belt 100 directly, not via the metal thermal conductor 200, is proposed as shown in FIG. 2.

FIG. 2 illustrates a fixing device 20R2 in which the heater 300 heats the endless belt 100 directly. Instead of the metal thermal conductor 200 depicted in FIG. 1, a nip formation plate 500 is disposed inside the loop formed by the endless belt 100 and presses against the pressing roller 400 via the endless belt 100 to form the fixing nip N between the endless belt 100 and the pressing roller 400. Since the nip formation plate 500 does not encircle the heater 300 unlike the metal thermal conductor 200 depicted in FIG. 1, the heater 300 heats the endless belt 100 directly, thus improving heating efficiency for heating the endless belt 100 and thereby shortening the first print time further and saving more energy.

On the other hand, as the endless belt 100 rotates and conveys the recording medium P, the endless belt 100 may be skewed in the axial direction thereof. To address this problem, a stationary flange 600 may be disposed at each lateral end 100*a* of the endless belt 100 in the axial direction thereof as shown in FIG. 3. As the endless belt 100 is skewed in the axial direction thereof, the lateral end 100*a* of the endless belt 100 in the axial direction thereof comes into contact with the flange 600 that restricts movement of the endless belt 100 in the axial direction thereof. However, as the lateral end 100*a* of the endless belt 100 comes into contact with the flange 600, it may be damaged by friction between the endless belt 100 and the stationary flange 600. To address this problem, a ring 700 may be interposed between the lateral end 100*a* of the endless belt 100 and the flange 600 to protect the lateral end 100*a* of the endless belt 100. For example, as the endless belt 100 is skewed in the axial direction thereof and the lateral end 100*a* of the endless belt 100 strikes the ring 700, the ring 700 rotates in accordance with rotation of the endless belt 100 with a reduced friction therebetween, thus minimizing damage and abrasion of the lateral end 100*a* of the endless belt 100.

However, the ring 700 is subject to deformation during assembly and operation. For example, if the ring 700 is deformed as it is attached between the endless belt 100 and the flange 600 or if the ring 700 is made of a low friction material that reduces friction between the ring 700 and the endless belt 100, the ring 700 is subject to plastic deformation that obstructs rotation of the ring 700 in accordance with rotation of the endless belt 100. Accordingly, the ring 700 may impose an increased load on the lateral end 100*a* of the endless belt 100, which may damage the lateral end 100*a* of the endless belt 100. Moreover, if the endless belt 100 deviates from its proper rotation locus and accidentally enters a through-hole of the ring 700, the ring 700 may damage the lateral end 100*a* of the endless belt 100.

SUMMARY OF THE INVENTION

This specification describes below an improved fixing device. In one exemplary embodiment of the present invention, the fixing device includes an endless belt, a belt holder, a first protection ring, and a second protection ring. The endless belt is rotatable in a predetermined direction of rotation. The belt holder contacts and rotatably supports each lateral end of the endless belt in an axial direction thereof. The first protection ring is contactably disposed adjacent to each lateral end of the endless belt in the axial direction thereof. The second protection ring is contactably disposed adjacent to the first protection ring in the axial direction of the endless belt. The first protection ring and the second protection ring are interposed between the endless belt and the belt holder in the axial direction of the endless belt and rotatable in accordance with rotation of the endless belt to protect each lateral end of the endless belt as the endless belt is skewed in the axial direction thereof and brought into contact with the first protection ring. A friction coefficient between the first protection ring and the second protection ring is smaller than a friction coefficient between the first protection ring and the endless belt.

This specification further describes an improved image forming apparatus. In one exemplary embodiment of the present invention, the image forming apparatus includes the fixing device described above.

BRIEF DESCRIPTION OF THE SEVERAL VIEWS OF THE DRAWINGS

A more complete appreciation of the invention and the many attendant advantages thereof will be readily obtained as the same becomes better understood by reference to the following detailed description when considered in connection with the accompanying drawings, wherein.

DETAILED DESCRIPTION OF THE INVENTION

Figure 1:
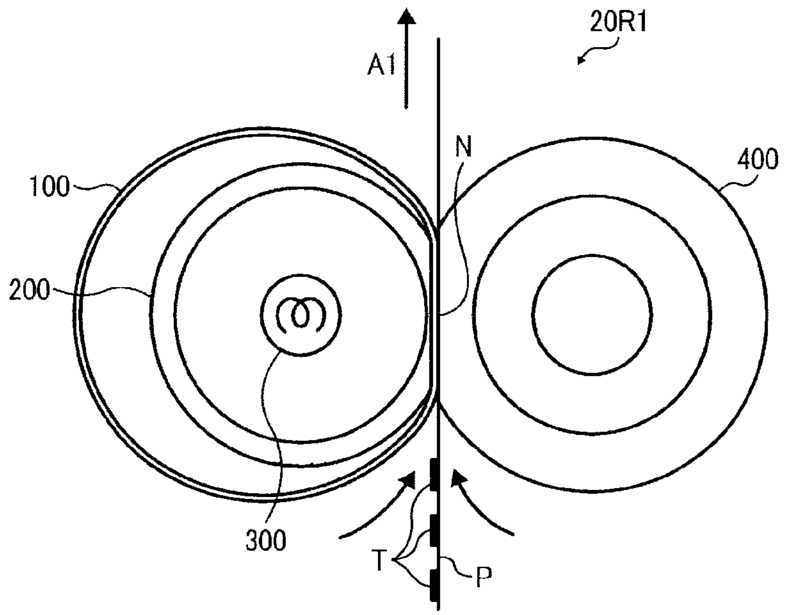
FIG. 1 RELATED ART
FIG. 1 is a schematic vertical sectional view of a related-art fixing device.
Figure 2:
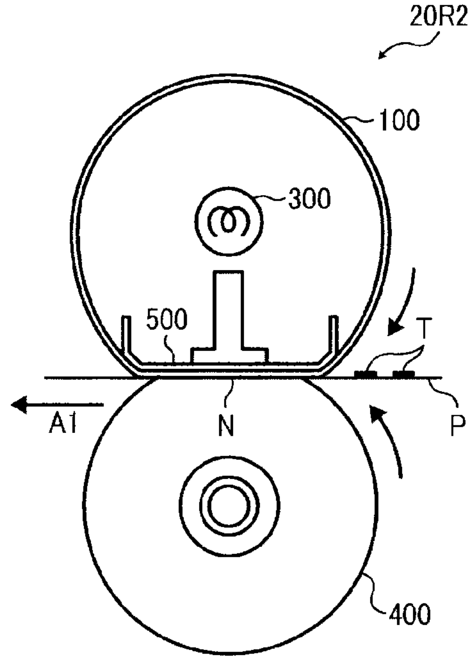
FIG. 2 RELATED ART
FIG. 2 is a schematic vertical sectional view of another related-art fixing device.
Figure 3:
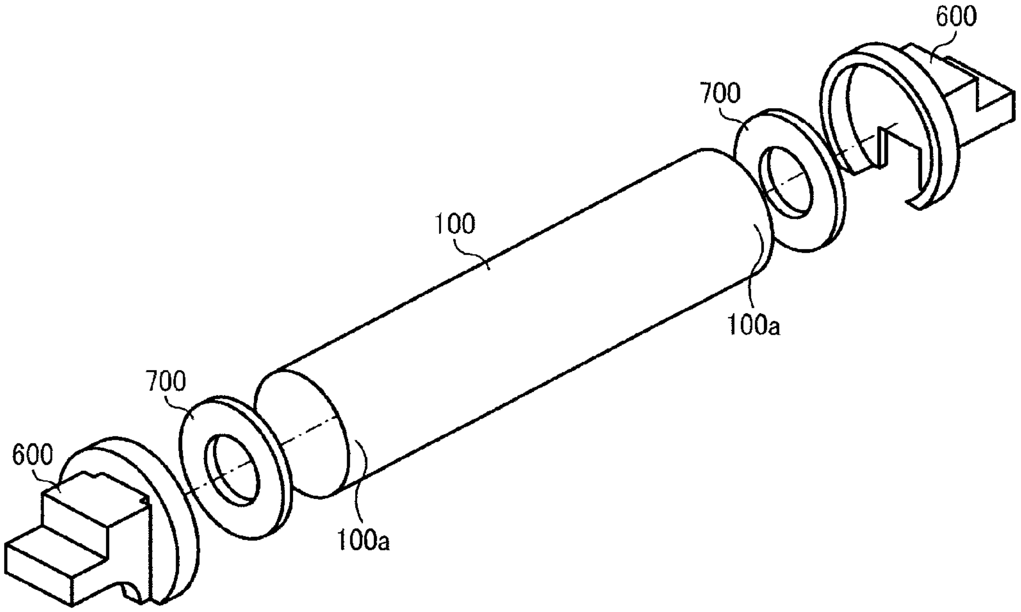
FIG. 3 RELATED ART
FIG. 3 is a perspective view of the related-art fixing device shown in FIG. 1 or 2 illustrating both lateral ends of an endless belt incorporated therein in an axial direction of the endless belt.

In describing exemplary embodiments illustrated in the drawings, specific terminology is employed for the sake of clarity. However, the disclosure of this specification is not intended to be limited to the specific terminology so selected and it is to be understood that each specific element includes all technical equivalents that operate in a similar manner and achieve a similar result.

Figure 4:
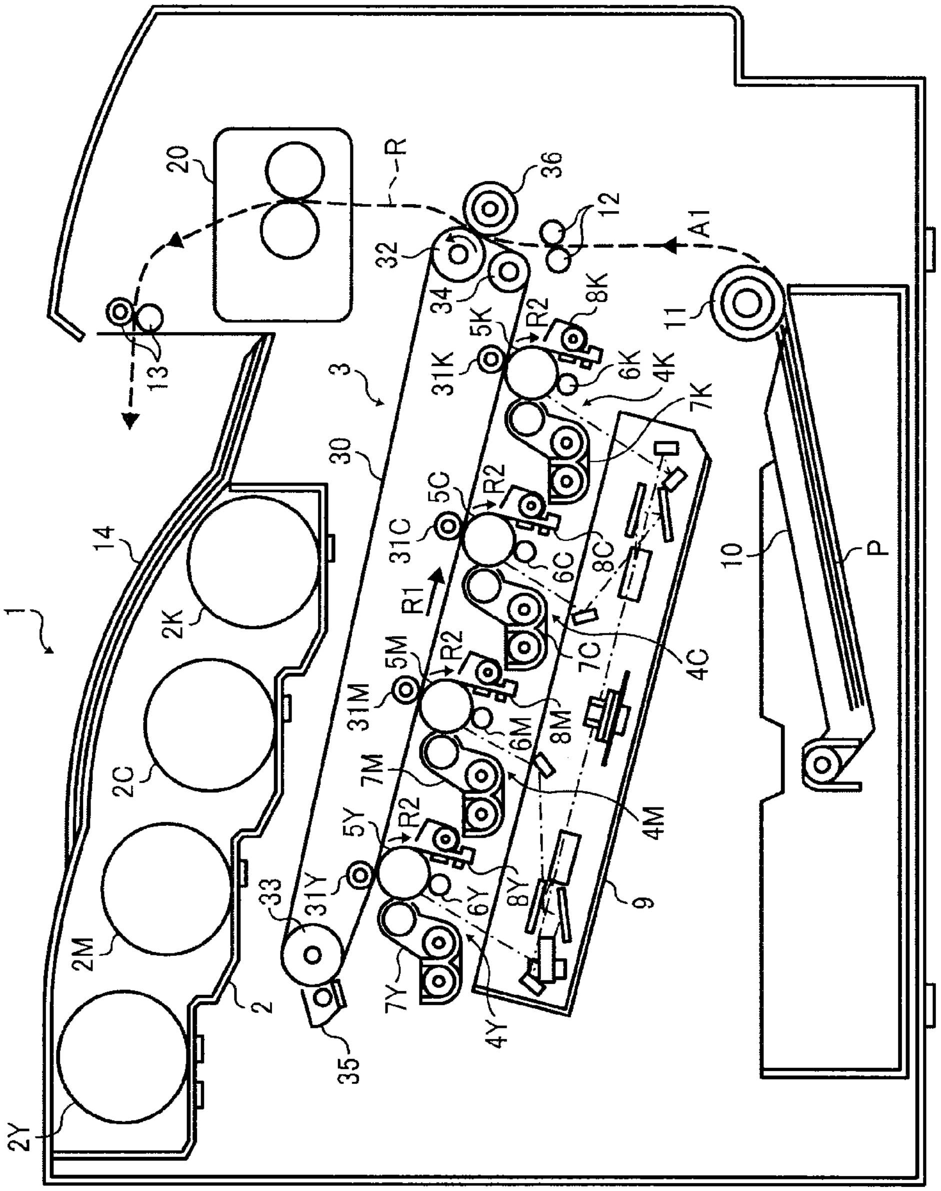
FIG. 4 is a schematic vertical sectional view of an image forming apparatus according to an exemplary embodiment of the present invention.

Referring now to the drawings, wherein like reference numerals designate identical or corresponding parts throughout the several views, in particular to FIG. 4, an image forming apparatus 1 according to an exemplary embodiment of the present invention is explained.

FIG. 4 is a schematic vertical sectional view of the image forming apparatus 1. The image forming apparatus 1 may be a copier, a facsimile machine, a printer, a multifunction printer (MFP) having at least one of copying, printing, scanning, plotter, and facsimile functions, or the like. According to this exemplary embodiment, the image forming apparatus 1 is a tandem color laser printer that forms color and monochrome toner images on recording media P by electrophotography.

As shown in FIG. 4, the image forming apparatus 1 includes four image forming devices 4Y, 4M, 4C, and 4K situated at a center portion thereof. Although the image forming devices 4Y, 4M, 4C, and 4K contain yellow, magenta, cyan, and black developers (e.g., toners) that form yellow, magenta, cyan, and black toner images, respectively, resulting in a color toner image, they have an identical structure.

For example, the image forming devices 4Y, 4M, 4C, and 4K include drum-shaped photoconductors 5Y, 5M, 5C, and 5K serving as a plurality of image carriers that carries an electrostatic latent image and a resultant toner image; chargers 6Y, 6M, 6C, and 6K that charge an outer circumferential surface of the respective photoconductors 5Y, 5M, 5C, and 5K; development devices 7Y, 7M, 7C, and 7K that supply yellow, magenta, cyan, and black toners to the electrostatic latent images formed on the outer circumferential surface of the respective photoconductors 5Y, 5M, 5C, and 5K, thus visualizing the electrostatic latent images into yellow, magenta, cyan, and black toner images with the yellow, magenta, cyan, and black toners, respectively; and cleaners 8Y, 8M, 8C, and 8K that clean the outer circumferential surface of the respective photoconductors 5Y, 5M, 5C, and 5K.

Below the image forming devices 4Y, 4M, 4C, and 4K is an exposure device 9 that exposes the outer circumferential surface of the respective photoconductors 5Y, 5M, 5C, and 5K with laser beams. For example, the exposure device 9, constructed of a light source, a polygon mirror, an f-θ lens, reflection mirrors, and the like, emits a laser beam onto the outer circumferential surface of the respective photoconductors 5Y, 5M, 5C, and 5K according to image data sent from an external device such as a client computer.

Above the image forming devices 4Y, 4M, 4C, and 4K is a transfer device 3. For example, the transfer device 3 includes an intermediate transfer belt 30 serving as an intermediate transferor, four primary transfer rollers 31Y, 31M, 31C, and 31K serving as primary transferors, a secondary transfer roller 36 serving as a secondary transferor, a secondary transfer backup roller 32, a cleaning backup roller 33, a tension roller 34, and a belt cleaner 35.

The intermediate transfer belt 30 is an endless belt stretched over the secondary transfer backup roller 32, the cleaning backup roller 33, and the tension roller 34. As a driver drives and rotates the secondary transfer backup roller 32 counterclockwise in FIG. 4, the secondary transfer backup roller 32 rotates the intermediate transfer belt 30 in a rotation direction R1 by friction therebetween.

The four primary transfer rollers 31Y, 31M, 31C, and 31K sandwich the intermediate transfer belt 30 together with the four photoconductors 5Y, 5M, 5C, and 5K, respectively, forming four primary transfer nips between the intermediate transfer belt 30 and the photoconductors 5Y, 5M, 5C, and 5K. The primary transfer rollers 31Y, 31M, 31C, and 31K are connected to a power supply that applies a predetermined direct current voltage and/or alternating current voltage thereto.

The secondary transfer roller 36 sandwiches the intermediate transfer belt 30 together with the secondary transfer backup roller 32, forming a secondary transfer nip between the secondary transfer roller 36 and the intermediate transfer belt 30. Similar to the primary transfer rollers 31Y, 31M, 31C, and 31K, the secondary transfer roller 36 is connected to the power supply that applies a predetermined direct current voltage and/or alternating current voltage thereto.

The belt cleaner 35 includes a cleaning brush and a cleaning blade that contact an outer circumferential surface of the intermediate transfer belt 30. A waste toner conveyance tube extending from the belt cleaner 35 to an inlet of a waste toner container conveys waste toner collected from the intermediate transfer belt 30 by the belt cleaner 35 to the waste toner container.

A bottle holder 2 situated in an upper portion of the image forming apparatus 1 accommodates four toner bottles 2Y, 2M, 2C, and 2K detachably attached thereto to contain and supply fresh yellow, magenta, cyan, and black toners to the development devices 7Y, 7M, 7C, and 7K of the image forming devices 4Y, 4M, 4C, and 4K, respectively. For example, the fresh yellow, magenta, cyan, and black toners are supplied from the toner bottles 2Y, 2M, 2C, and 2K to the development devices 7Y, 7M, 7C, and 7K through toner supply tubes interposed between the toner bottles 2Y, 2M, 2C, and 2K and the development devices 7Y, 7M, 7C, and 7K, respectively.

In a lower portion of the image forming apparatus 1 are a paper tray 10 that loads a plurality of recording media P (e.g., sheets) and a feed roller 11 that picks up and feeds a recording medium P from the paper tray 10 toward the secondary transfer nip formed between the secondary transfer roller 36 and the intermediate transfer belt 30. The recording media P may be thick paper, postcards, envelopes, plain paper, thin paper, coated paper, art paper, tracing paper, OHP (overhead projector) transparencies, OHP film sheets, and the like. Additionally, a bypass tray may be attached to the image forming apparatus 1 that loads postcards, envelopes, OHP transparencies, OHP film sheets, and the like.

A conveyance path R extends from the feed roller 11 to an output roller pair 13 to convey the recording medium P picked up from the paper tray 10 onto an outside of the image forming apparatus 1 through the secondary transfer nip. The conveyance path R is provided with a registration roller pair 12 located below the secondary transfer nip formed between the secondary transfer roller 36 and the intermediate transfer belt 30, that is, upstream from the secondary transfer nip in a recording medium conveyance direction A1. The registration roller pair 12 feeds the recording medium P conveyed from the feed roller 11 toward the secondary transfer nip.

The conveyance path R is further provided with a fixing device 20 located above the secondary transfer nip, that is, downstream from the secondary transfer nip in the recording medium conveyance direction A1. The fixing device 20 fixes the color toner image transferred from the intermediate transfer belt 30 onto the recording medium P. The conveyance path R is further provided with the output roller pair 13 located above the fixing device 20, that is, downstream from the fixing device 20 in the recording medium conveyance direction A1. The output roller pair 13 discharges the recording medium P bearing the fixed color toner image onto the outside of the image forming apparatus 1, that is, an output tray 14 disposed atop the image forming apparatus 1. The output tray 14 stocks the recording medium P discharged by the output roller pair 13.

With reference to FIG. 4, a description is provided of an image forming operation of the image forming apparatus 1 having the structure described above to form a color toner image on a recording medium P.

As a print job starts, a driver drives and rotates the photoconductors 5Y, 5M, 5C, and 5K of the image forming devices 4Y, 4M, 4C, and 4K, respectively, clockwise in FIG. 4 in a rotation direction R2. The chargers 6Y, 6M, 6C, and 6K uniformly charge the outer circumferential surface of the respective photoconductors 5Y, 5M, 5C, and 5K at a predetermined polarity. The exposure device 9 emits laser beams onto the charged outer circumferential surface of the respective photoconductors 5Y, 5M, 5C, and 5K according to yellow, magenta, cyan, and black image data contained in image data sent from the external device, respectively, thus forming electrostatic latent images thereon. The development devices 7Y, 7M, 7C, and 7K supply yellow, magenta, cyan, and black toners to the electrostatic latent images formed on the photoconductors 5Y, 5M, 5C, and 5K, visualizing the electrostatic latent images into yellow, magenta, cyan, and black toner images, respectively.

Simultaneously, as the print job starts, the secondary transfer backup roller 32 is driven and rotated counterclockwise in FIG. 4, rotating the intermediate transfer belt 30 in the rotation direction R1 by friction therebetween. A power supply applies a constant voltage or a constant current control voltage having a polarity opposite a polarity of the toner to the primary transfer rollers 31Y, 31M, 31C, and 31K. Thus, a transfer electric field is created at the primary transfer nips formed between the primary transfer rollers 31Y, 31M, 31C, and 31K and the photoconductors 5Y, 5M, 5C, and 5K, respectively.

When the yellow, magenta, cyan, and black toner images formed on the photoconductors 5Y, 5M, 5C, and 5K reach the primary transfer nips, respectively, in accordance with rotation of the photoconductors 5Y, 5M, 5C, and 5K, the yellow, magenta, cyan, and black toner images are primarily transferred from the photoconductors 5Y, 5M, 5C, and 5K onto the intermediate transfer belt 30 by the transfer electric field created at the primary transfer nips in such a manner that the yellow, magenta, cyan, and black toner images are superimposed successively on a same position on the intermediate transfer belt 30. Thus, a color toner image is formed on the intermediate transfer belt 30. After the primary transfer of the yellow, magenta, cyan, and black toner images from the photoconductors 5Y, 5M, 5C, and 5K onto the intermediate transfer belt 30, the cleaners 8Y, 8M, 8C, and 8K remove residual toner failed to be transferred onto the intermediate transfer belt 30 and therefore remaining on the photoconductors 5Y, 5M, 5C, and 5K therefrom. Thereafter, dischargers discharge the outer circumferential surface of the respective photoconductors 5Y, 5M, 5C, and 5K, initializing the surface potential thereof.

On the other hand, the feed roller 11 disposed in the lower portion of the image forming apparatus 1 is driven and rotated to feed a recording medium P from the paper tray 10 toward the registration roller pair 12 in the conveyance path R. The registration roller pair 12 feeds the recording medium P to the secondary transfer nip formed between the secondary transfer roller 36 and the intermediate transfer belt 30 at a time when the color toner image formed on the intermediate transfer belt 30 reaches the secondary transfer nip. The secondary transfer roller 36 is applied with a transfer voltage having a polarity opposite a polarity of the charged yellow, magenta, cyan, and black toners constituting the color toner image formed on the intermediate transfer belt 30, thus creating a transfer electric field at the secondary transfer nip.

When the color toner image formed on the intermediate transfer belt 30 reaches the secondary transfer nip in accordance with rotation of the intermediate transfer belt 30, the color toner image is secondarily transferred from the intermediate transfer belt 30 onto the recording medium P by the transfer electric field created at the secondary transfer nip. After the secondary transfer of the color toner image from the intermediate transfer belt 30 onto the recording medium P, the belt cleaner 35 removes residual toner failed to be transferred onto the recording medium P and therefore remaining on the intermediate transfer belt 30 therefrom. The removed toner is conveyed and collected into the waste toner container.

Thereafter, the recording medium P bearing the color toner image is conveyed to the fixing device 20 that fixes the color toner image on the recording medium P. Then, the recording medium P bearing the fixed color toner image is discharged by the output roller pair 13 onto the output tray 14.

The above describes the image forming operation of the image forming apparatus 1 to form the color toner image on the recording medium P. Alternatively, the image forming apparatus 1 may form a monochrome toner image by using any one of the four image forming devices 4Y, 4M, 4C, and 4K or may form a bicolor or tricolor toner image by using two or three of the image forming devices 4Y, 4M, 4C, and 4K.

Figure 5:
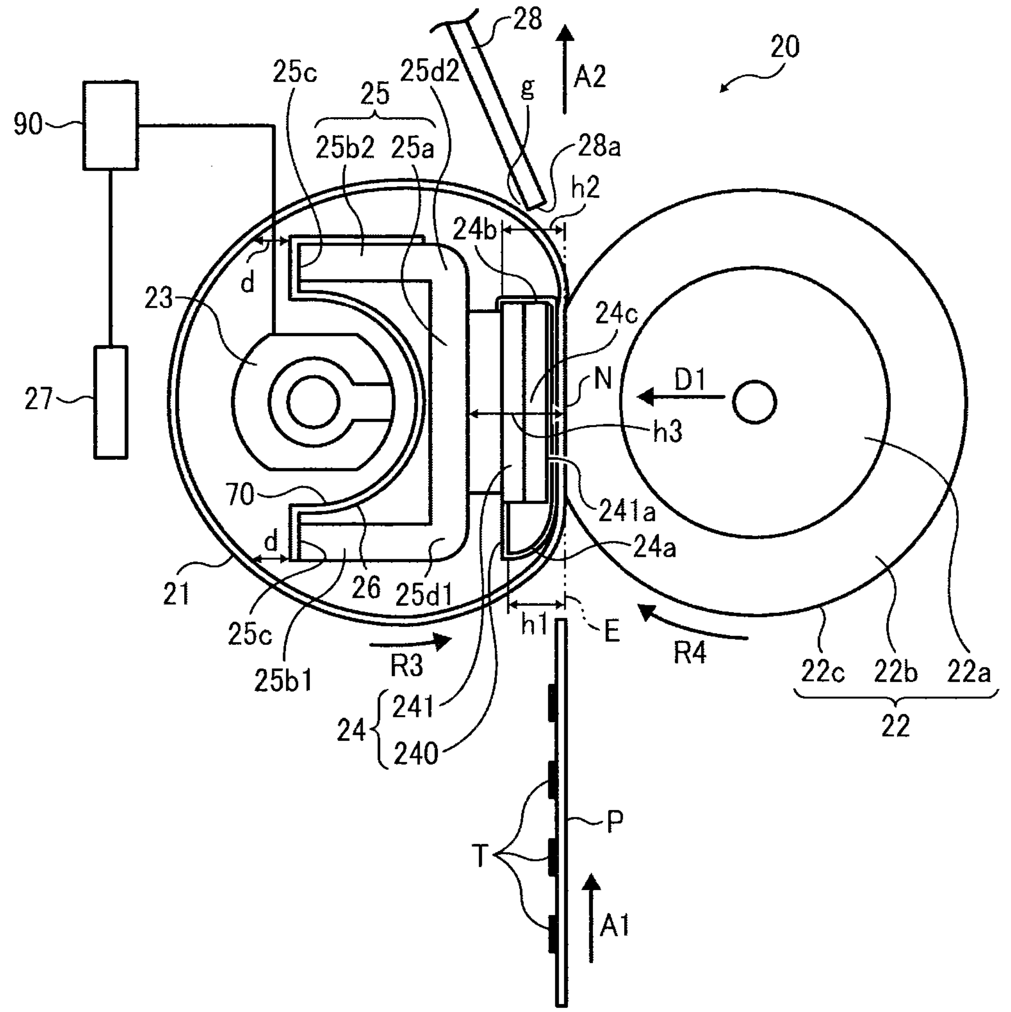
FIG. 5 is a vertical sectional view of a fixing device according to a first exemplary embodiment of the present invention that is incorporated in the image forming apparatus shown in FIG. 4.

With reference to FIG. 5, a description is provided of a construction of the fixing device 20 according to a first exemplary embodiment that is incorporated in the image forming apparatus 1 described above.

FIG. 5 is a vertical sectional view of the fixing device 20. As shown in FIG. 5, the fixing device 20 (e.g., a fuser) includes a fixing belt 21 serving as a fixing rotary body or an endless belt formed into a loop and rotatable in a rotation direction R3; a pressing roller 22 serving as an opposed rotary body disposed opposite an outer circumferential surface of the fixing belt 21 and rotatable in a rotation direction R4 counter to the rotation direction R3 of the fixing belt 21; a halogen heater 23 serving as a heater disposed inside the loop formed by the fixing belt 21 and heating the fixing belt 21; a nip formation assembly 24 disposed inside the loop formed by the fixing belt 21 and pressing against the pressing roller 22 via the fixing belt 21 to form a fixing nip N between the fixing belt 21 and the pressing roller 22; a stay 25 serving as a support disposed inside the loop formed by the fixing belt 21 and contacting and supporting the nip formation assembly 24; a reflector 26 disposed inside the loop formed by the fixing belt 21 and reflecting light radiated from the halogen heater 23 toward the fixing belt 21; a temperature sensor 27 serving as a temperature detector disposed opposite the outer circumferential surface of the fixing belt 21 and detecting the temperature of the fixing belt 21; and a separator 28 disposed opposite the outer circumferential surface of the fixing belt 21 and separating the recording medium P from the fixing belt 21. The fixing device 20 further includes a pressurization assembly that presses the pressing roller 22 against the nip formation assembly 24 via the fixing belt 21.

A detailed description is now given of a construction of the fixing belt 21.

The fixing belt 21 is a thin, flexible endless belt or film. For example, the fixing belt 21 is constructed of a base layer constituting an inner circumferential surface of the fixing belt 21 and a release layer constituting the outer circumferential surface of the fixing belt 21. The base layer is made of metal such as nickel and SUS stainless steel or resin such as polyimide (PI). The release layer is made of tetrafluoroethylene-perfluoroalkylvinylether copolymer (PFA), polytetrafluoroethylene (PTFE), or the like. Alternatively, an elastic layer, made of rubber such as silicone rubber, silicone rubber foam, and fluoro rubber, may be interposed between the base layer and the release layer.

A detailed description is now given of a construction of the pressing roller 22.

The pressing roller 22 is constructed of a metal core 22*a*; an elastic layer 22*b* coating the metal core 22*a* and made of silicone rubber foam, silicone rubber, fluoro rubber, or the like; and a release layer 22*c* coating the elastic layer 22*b* and made of PFA, PTFE, or the like. The pressurization assembly presses the pressing roller 22 against the nip formation assembly 24 via the fixing belt 21. Thus, the pressing roller 22 pressingly contacting the fixing belt 21 deforms the elastic layer 22*b* of the pressing roller 22 at the fixing nip N formed between the pressing roller 22 and the fixing belt 21, thus creating the fixing nip N having a predetermined length in the recording medium conveyance direction A1. A driver (e.g., a motor) disposed inside the image forming apparatus 1 depicted in FIG. 4 drives and rotates the pressing roller 22. As the driver drives and rotates the pressing roller 22, a driving force of the driver is transmitted from the pressing roller 22 to the fixing belt 21 at the fixing nip N, thus rotating the fixing belt 21 by friction between the pressing roller 22 and the fixing belt 21.

According to this exemplary embodiment, the pressing roller 22 is a solid roller. Alternatively, the pressing roller 22 may be a hollow roller. In this case, a heater such as a halogen heater may be disposed inside the hollow roller. If the pressing roller 22 does not incorporate the elastic layer 22*b*, the pressing roller 22 has a decreased thermal capacity that improves fixing performance of being heated to the predetermined fixing temperature quickly. However, as the pressing roller 22 and the fixing belt 21 sandwich and press a toner image T on a recording medium P passing through the fixing nip N, slight surface asperities of the fixing belt 21 may be transferred onto the toner image T on the recording medium P, resulting in variation in gloss of the solid toner image T. To address this problem, it is preferable that the pressing roller 22 incorporates the elastic layer 22*b* having a thickness not smaller than about 100 micrometers. The elastic layer 22*b* having the thickness not smaller than about 100 micrometers elastically deforms to absorb slight surface asperities of the fixing belt 21, preventing variation in gloss of the toner image T on the recording medium P. The elastic layer 22*b* may be made of solid rubber. Alternatively, if no heater is disposed inside the pressing roller 22, the elastic layer 22*b* may be made of sponge rubber. The sponge rubber is more preferable than the solid rubber because it has an increased insulation that draws less heat from the fixing belt 21. According to this exemplary embodiment, the pressing roller 22 is pressed against the fixing belt 21. Alternatively, the pressing roller 22 may merely contact the fixing belt 21 with no pressure therebetween.

A detailed description is now given of a configuration of the halogen heater 23.

Both lateral ends of the halogen heater 23 in a longitudinal direction thereof parallel to an axial direction of the fixing belt 21 are mounted on side plates of the fixing device 20, respectively. A power supply situated inside the image forming apparatus 1 supplies power to the halogen heater 23 so that the halogen heater 23 heats the fixing belt 21. A controller 90, that is, a central processing unit (CPU), provided with a random-access memory (RAM) and a read-only memory (ROM), for example, operatively connected to the halogen heater 23 and the temperature sensor 27 controls the halogen heater 23 based on the temperature of the fixing belt 21 detected by the temperature sensor 27 so as to adjust the temperature of the fixing belt 21 to a desired fixing temperature. Alternatively, an induction heater, a resistance heat generator, a carbon heater, or the like may be employed as a heater to heat the fixing belt 21 instead of the halogen heater 23.

A detailed description is now given of a construction of the nip formation assembly 24.

The nip formation assembly 24 includes a base pad 241 and a slide sheet 240 (e.g., a low friction sheet) covering an outer surface of the base pad 241. A longitudinal direction of the base pad 241 is parallel to the axial direction of the fixing belt 21 or the pressing roller 22. The base pad 241 receives pressure from the pressing roller 22 to define the shape of the fixing nip N. The base pad 241 is mounted on and supported by the stay 25. Accordingly, even if the base pad 241 receives pressure from the pressing roller 22, the base pad 241 is not bent by the pressure and therefore produces a uniform nip width throughout the entire width of the pressing roller 22 in the axial direction thereof. The stay 25 is made of metal having an increased mechanical strength, such as stainless steel and iron, to support the nip formation assembly 24 against pressure from the pressing roller 22, thus preventing bending of the nip formation assembly 24. The base pad 241 is also made of a rigid material having an increased mechanical strength. For example, the base pad 241 is made of resin such as liquid crystal polymer (LCP), metal, ceramic, or the like.

The base pad 241 is made of a heat-resistant material having resistance against temperatures not lower than about 200 degrees centigrade. Accordingly, even if the base pad 241 is heated to a predetermined fixing temperature range, the base pad 241 is not thermally deformed, thus retaining the desired shape of the fixing nip N stably and thereby maintaining the quality of the fixed toner image T on the recording medium P. For example, the base pad 241 is made of general heat-resistant resin such as polyether sulfone (PES), polyphenylene sulfide (PPS), liquid crystal polymer (LCP), polyether nitrile (PEN), polyamide imide (PAI), polyether ether ketone (PEEK), or the like.

The slide sheet 240 is interposed at least between the base pad 241 and the fixing belt 21. For example, the slide sheet 240 covers at least an opposed face 241*a* of the base pad 241 disposed opposite the fixing belt 21 at the fixing nip N. As the fixing belt 21 rotates in the rotation direction R3, it slides over the slide sheet 240, decreasing a driving torque exerted on the fixing belt 21. Accordingly, a decreased friction is imposed onto the fixing belt 21 from the nip formation assembly 24. Alternatively, the nip formation assembly 24 may not incorporate the slide sheet 240.

The reflector 26 is interposed between the stay 25 and the halogen heater 23. According to this exemplary embodiment, the reflector 26 is mounted on the stay 25. For example, the reflector 26 is made of aluminum, stainless steel, or the like. The reflector 26 has a reflection face 70 that reflects light radiated from the halogen heater 23 thereto toward the fixing belt 21. Accordingly, the fixing belt 21 receives an increased amount of light from the halogen heater 23 and thereby is heated efficiently. Additionally, the reflector 26 minimizes transmission of radiation heat from the halogen heater 23 to the stay 25, thus saving energy.

A shield is interposed between the halogen heater 23 and the fixing belt 21 at both lateral ends of the fixing belt 21 in the axial direction thereof. The shield shields the fixing belt 21 against heat from the halogen heater 23. For example, even if a plurality of small recording media P is conveyed through the fixing nip N continuously, the shield prevents heat from the halogen heater 23 from being conducted to both lateral ends of the fixing belt 21 in the axial direction thereof where the small recording media P are not conveyed. Accordingly, both lateral ends of the fixing belt 21 do not overheat even in the absence of large recording media P that draw heat therefrom. Consequently, the shield minimizes thermal wear and damage of the fixing belt 21.

The fixing device 20 according to this exemplary embodiment attains various improvements to save more energy and shorten a first print time taken to output a recording medium P bearing a fixed toner image T onto the outside of the image forming apparatus 1 depicted in FIG. 4 after the image forming apparatus 1 receives a print job. As a first improvement, the fixing device 20 employs a direct heating method in which the halogen heater 23 directly heats the fixing belt 21 at a portion thereof other than a nip portion thereof facing the fixing nip N. For example, as shown in FIG. 5, no component is interposed between the halogen heater 23 and the fixing belt 21 at an outward portion of the fixing belt 21 disposed opposite the temperature sensor 27. Accordingly, radiation heat from the halogen heater 23 is directly transmitted to the fixing belt 21 at the outward portion thereof.

As a second improvement, the fixing belt 21 is designed to be thin and have a reduced loop diameter so as to decrease the thermal capacity thereof. For example, the fixing belt 21 is constructed of the base layer having a thickness in a range of from about 20 micrometers to about 50 micrometers; the elastic layer having a thickness in a range of from about 100 micrometers to about 300 micrometers; and the release layer having a thickness in a range of from about 10 micrometers to about 50 micrometers. Thus, the fixing belt 21 has a total thickness not greater than about 1 mm. A loop diameter of the fixing belt 21 is in a range of from about 20 mm to about 40 mm. In order to decrease the thermal capacity of the fixing belt 21 further, the fixing belt 21 may have a total thickness not greater than about 0.20 mm, preferably not greater than about 0.16 mm. Additionally, the loop diameter of the fixing belt 21 may be not greater than about 30 mm.

According to this exemplary embodiment, the pressing roller 22 has a diameter in a range of from about 20 mm to about 40 mm so that the loop diameter of the fixing belt 21 is equivalent to the diameter of the pressing roller 22. However, the loop diameter of the fixing belt 21 and the diameter of the pressing roller 22 are not limited to the above. For example, the loop diameter of the fixing belt 21 may be smaller than the diameter of the pressing roller 22. In this case, a curvature of the fixing belt 21 at the fixing nip N is greater than that of the pressing roller 22, facilitating separation of the recording medium P discharged from the fixing nip N from the fixing belt 21.

Since the fixing belt 21 has a decreased loop diameter, space inside the loop formed by the fixing belt 21 is small. To address this circumstance, both ends of the stay 25 in the recording medium conveyance direction A1 are folded into a square bracket that accommodates the halogen heater 23. Thus, the stay 25 and the halogen heater 23 are placed in the small space inside the loop formed by the fixing belt 21.

In contrast to the stay 25, the nip formation assembly 24 is compact, thus allowing the stay 25 to extend as long as possible in the small space inside the loop formed by the fixing belt 21. For example, the length of the base pad 241 of the nip formation assembly 24 is smaller than that of the stay 25 in the recording medium conveyance direction A1.

As shown in FIG. 5, the base pad 241 includes an upstream portion 24*a* disposed upstream from the fixing nip N in the recording medium conveyance direction A1; a downstream portion 24*b* disposed downstream from the fixing nip N in the recording medium conveyance direction A1; and a center portion 24*c* interposed between the upstream portion 24*a* and the downstream portion 24*b* in the recording medium conveyance direction A1. A height h1 defines a height of the upstream portion 24*a* from the fixing nip N or its hypothetical extension E in a pressurization direction D1 of the pressing roller 22 in which the pressing roller 22 is pressed against the nip formation assembly 24. A height h2 defines a height of the downstream portion 24*b* from the fixing nip N or its hypothetical extension E in the pressurization direction D1 of the pressing roller 22. A height h3, that is, a maximum height of the base pad 241, defines a height of the center portion 24*c* from the fixing nip N or its hypothetical extension E in the pressurization direction D1 of the pressing roller 22. The height h3 is not smaller than the height h1 and the height h2. Hence, the upstream portion 24*a* of the base pad 241 of the nip formation assembly 24 is not interposed between the inner circumferential surface of the fixing belt 21 and an upstream curve 25*d*1 of the stay 25 in a diametrical direction of the fixing belt 21. Similarly, the downstream portion 24*b* of the base pad 241 of the nip formation assembly 24 is not interposed between the inner circumferential surface of the fixing belt 21 and a downstream curve 25*d*2 of the stay 25 in the diametrical direction of the fixing belt 21 and the pressurization direction D1 of the pressing roller 22. Accordingly, the upstream curve 25*d*1 and the downstream curve 25*d*2 of the stay 25 are situated in proximity to the inner circumferential surface of the fixing belt 21. Consequently, the stay 25 having an increased size that enhances the mechanical strength thereof is accommodated in the limited space inside the loop formed by the fixing belt 21. As a result, the stay 25, with its enhanced mechanical strength, supports the nip formation assembly 24 properly, preventing bending of the nip formation assembly 24 caused by pressure from the pressing roller 22 and thereby improving fixing performance.

As shown in FIG. 5, the stay 25 includes a base 25*a* contacting the nip formation assembly 24 and an upstream arm 25*b*1 and a downstream arm 25*b*2, constituting a pair of projections, projecting from the base 25*a*. The base 25*a* extends in the recording medium conveyance direction A1, that is, a vertical direction in FIG. 5. The upstream arm 25*b*1 and the downstream arm 25*b*2 project from an upstream end and a downstream end of the base 25*a*, respectively, in the recording medium conveyance direction A1 and extend in the pressurization direction D1 of the pressing roller 22 orthogonal to the recording medium conveyance direction A1. The upstream arm 25*b*1 and the downstream arm 25*b*2 projecting from the base 25*a* in the pressurization direction D1 of the pressing roller 22 elongate a cross-sectional area of the stay 25 in the pressurization direction D1 of the pressing roller 22, increasing the section modulus and the mechanical strength of the stay 25.

Additionally, the upstream arm 25*b*1 and the downstream arm 25*b*2 elongated in the pressurization direction D1 of the pressing roller 22 enhance the mechanical strength of the stay 25. Accordingly, a front edge 25*c* of each of the upstream arm 25*b*1 and the downstream arm 25*b*2 situated as close as possible to the inner circumferential surface of the fixing belt 21 allows the upstream arm 25*b*1 and the downstream arm 25*b*2 to project longer from the base 25*a* in the pressurization direction D1 of the pressing roller 22. However, since the fixing belt 21 swings or vibrates as it rotates, if the front edge 25*c* of each of the upstream arm 25*b*1 and the downstream arm 25*b*2 is excessively close to the inner circumferential surface of the fixing belt 21, the swinging or vibrating fixing belt 21 may come into contact with the upstream arm 25*b*1 or the downstream arm 25*b*2. For example, if the thin fixing belt 21 is used as in this exemplary embodiment, the thin fixing belt 21 swings or vibrates substantially. Accordingly, it is necessary to position the front edge 25*c* of each of the upstream arm 25*b*1 and the downstream arm 25*b*2 with respect to the fixing belt 21 carefully.

Specifically, as shown in FIG. 5, a distance d between the front edge 25*c* of each of the upstream arm 25*b*1 and the downstream arm 25*b*2 and the inner circumferential surface of the fixing belt 21 in the pressurization direction D1 of the pressing roller 22 is at least about 2.0 mm, preferably not smaller than about 3.0 mm. Conversely, if the fixing belt 21 is thick and therefore barely swings or vibrates, the distance d is about 0.02 mm. It is to be noted that if the reflector 26 is attached to the front edge 25*c* of each of the upstream arm 25*b*1 and the downstream arm 25*b*2 as in this exemplary embodiment, the distance d is determined by considering the thickness of the reflector 26 so that the reflector 26 does not contact the fixing belt 21.

The front edge 25*c* of each of the upstream arm 25*b*1 and the downstream arm 25*b*2 situated as close as possible to the inner circumferential surface of the fixing belt 21 allows the upstream arm 25*b*1 and the downstream arm 25*b*2 to project longer from the base 25*a* in the pressurization direction D1 of the pressing roller 22. Accordingly, even if the fixing belt 21 has a decreased loop diameter, the stay 25 having the longer upstream arm 25*b*1 and the longer downstream arm 25*b*2 attains an enhanced mechanical strength.

With reference to FIG. 5, a description is provided of a fixing operation of the fixing device 20 described above.

As the image forming apparatus 1 depicted in FIG. 4 is powered on, the power supply supplies power to the halogen heater 23 and at the same time the driver drives and rotates the pressing roller 22 clockwise in FIG. 5 in the rotation direction R4. Accordingly, the fixing belt 21 rotates counterclockwise in FIG. 5 in the rotation direction R3 in accordance with rotation of the pressing roller 22 by friction between the pressing roller 22 and the fixing belt 21.

A recording medium P bearing a toner image T formed by the image forming operation of the image forming apparatus 1 described above is conveyed in the recording medium conveyance direction A1 while guided by a guide plate and enters the fixing nip N formed between the pressing roller 22 and the fixing belt 21 pressed by the pressing roller 22. The fixing belt 21 heated by the halogen heater 23 heats the recording medium P and at the same time the pressing roller 22 pressed against the fixing belt 21 and the fixing belt 21 together exert pressure to the recording medium P, thus fixing the toner image T on the recording medium P.

The recording medium P bearing the fixed toner image T is discharged from the fixing nip N in a recording medium conveyance direction A2. As a leading edge of the recording medium P comes into contact with a front edge of the separator 28, the separator 28 separates the recording medium P from the fixing belt 21. Thereafter, the separated recording medium P is discharged by the output roller pair 13 depicted in FIG. 4 onto the outside of the image forming apparatus 1, that is, the output tray 14 where the recording medium P is stocked.

With reference to FIGS. 6A, 6B, 6C, and 7, a description is provided of a configuration of a lateral end of the fixing belt 21 in the axial direction thereof.

Figure 6A:
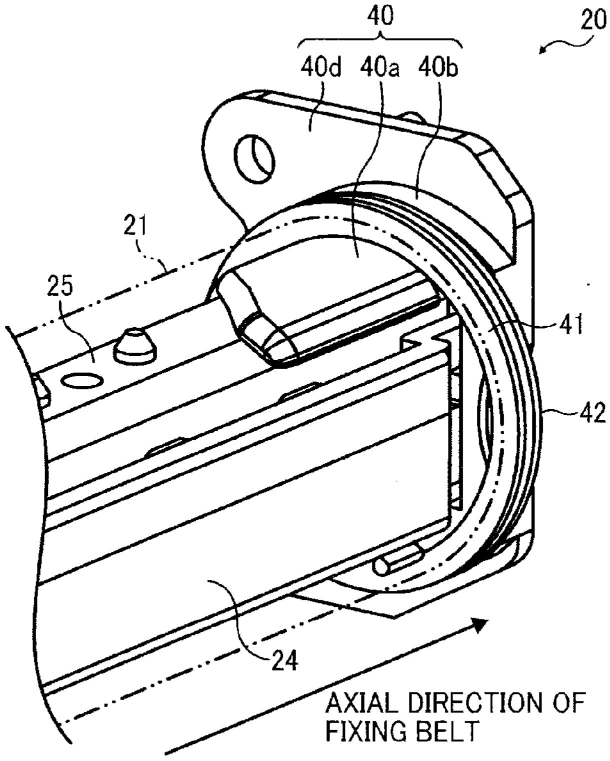
FIG. 6A is a partial perspective view of the fixing device shown in FIG. 5 illustrating one lateral end of a fixing belt incorporated therein in an axial direction thereof.
Figure 6B:
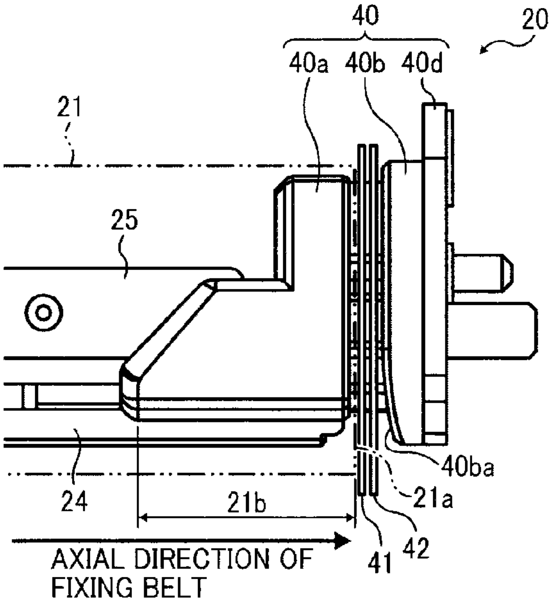
FIG. 6B is a partial plan view of the fixing device shown in FIG. 6A.
Figure 6C:
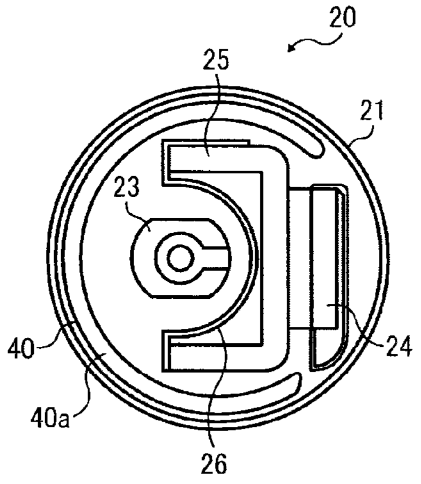
FIG. 6C is a vertical sectional view of the fixing device shown in FIG. 6A illustrating one lateral end of the fixing belt in the axial direction thereof.
Figure 7:
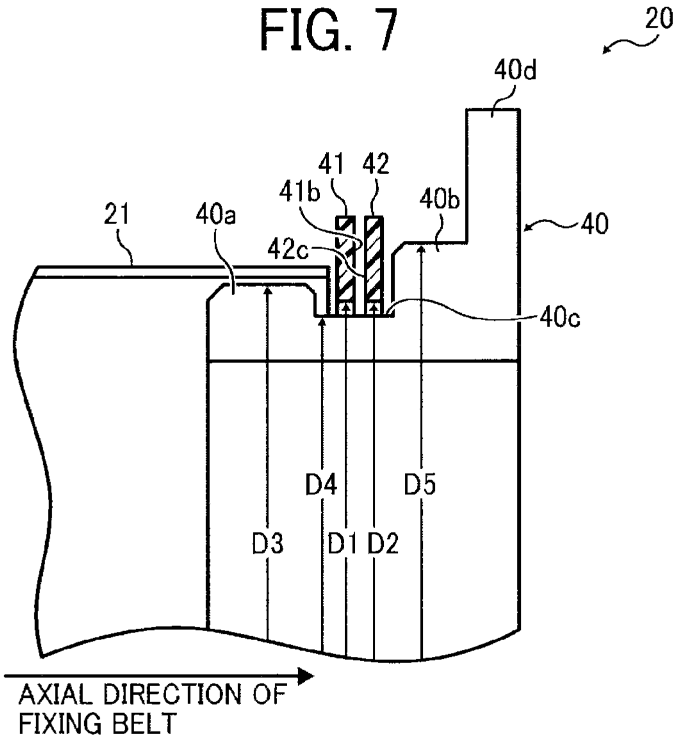
FIG. 7 is a partial horizontal sectional view of the fixing device shown in FIG. 6A.

FIG. 6A is a perspective view of one lateral end of the fixing belt 21 in the axial direction thereof. FIG. 6B is a plan view of one lateral end of the fixing belt 21 in the axial direction thereof. FIG. 6C is a vertical sectional view of one lateral end of the fixing belt 21 in the axial direction thereof. FIG. 7 is a partial horizontal sectional view of the fixing device 20 illustrating one lateral end of the fixing belt 21 in the axial direction thereof. Although not shown, another lateral end of the fixing belt 21 in the axial direction thereof has the identical configuration shown in FIGS. 6A to 6C. Hence, the following describes the configuration of one lateral end of the fixing belt 21 in the axial direction thereof with reference to FIGS. 6A to 6C.

As shown in FIGS. 6A and 6B, a belt holder 40 is inserted into the loop formed by the fixing belt 21 at a lateral end 21*b* of the fixing belt 21 in the axial direction thereof to rotatably support the lateral end 21*b* of the fixing belt 21. For example, the belt holder 40 includes a substantially tubular, belt support 40*a* inserted into the loop formed by the fixing belt 21 and disposed opposite the inner circumferential surface of the fixing belt 21; a substantially tubular regulator 40*b* disposed outboard from the belt support 40*a* in the axial direction of the fixing belt 21; and a mount 40*d* disposed outboard from the regulator 40*b* in the axial direction of the fixing belt 21 and mounting the regulator 40*b*. The belt support 40*a* is C-shaped in cross-section as shown in FIG. 6C. The regulator 40*b* has an outer diameter greater than that of the belt support 40*a*. The mount 40*d* is mounted on a cabinet of the fixing device 20. The outer diameter of the regulator 40*b* is at least greater than that of the fixing belt 21, thus restricting skew of the fixing belt 21 as the fixing belt 21 is accidentally skewed in the axial direction thereof.

As shown in FIG. 6C, the belt holder 40 is C-shaped in cross-section to create an opening disposed opposite the fixing nip N where the nip formation assembly 24 is situated. As shown in FIG. 6B, each lateral end of the stay 25 in a longitudinal direction thereof parallel to the axial direction of the fixing belt 21 is mounted on and positioned by the belt holder 40.

As shown in FIG. 6B, two slip rings, that is, the first slip ring 41 and the second slip ring 42, are adjacent to each other and interposed between a lateral edge 21*a* of the fixing belt 21 and an inward face 40*ba* of the regulator 40*b* of the belt holder 40 disposed opposite the lateral edge 21*a* of the fixing belt 21 in the axial direction thereof. The first slip ring 41 and the second slip ring 42 serve as a first protection ring and a second protection ring that protect the lateral end 21*b* of the fixing belt 21 in the axial direction thereof.

As shown in FIG. 7, the belt holder 40 further includes a groove 40*c* (e.g., a recess) interposed between the belt support 40*a* and the regulator 40*b* in the axial direction of the fixing belt 21. The groove 40*c* partially faces the inner circumferential surface of the fixing belt 21 and is produced along a circumferential direction of the fixing belt 21. The first slip ring 41 and the second slip ring 42 are rotatably attached to or hung on the groove 40*c*. An outer diameter D4 of the groove 40*c* is smaller than an outer diameter D3 of the belt support 40*a*. The outer diameter D3 of the belt support 40*a* is smaller than an outer diameter D5 of the regulator 40*b*. For example, the first slip ring 41 and the second slip ring 42 are inserted onto the groove 40*c* from the belt support 40*a*. An inner diameter D1 of the first slip ring 41 and an inner diameter D2 of the second slip ring 42 are smaller than the outer diameter D3 of a lower bank, that is, the belt support 40*a*. Accordingly, in order to engage the first slip ring 41 and the second slip ring 42 with the groove 40*c*, the first slip ring 41 and the second slip ring 42 are deformed to enlarge the inner diameter D1 of the first slip ring 41 and the inner diameter D2 of the second slip ring 42, stretched over the belt support 40*a*, and moved across the lower bank, that is, the belt support 40*a*, rightward in FIG. 7 onto the groove 40*c*. According to this exemplary embodiment shown in FIG. 7, the inner diameter D1 of the first slip ring 41 is equivalent to the inner diameter D2 of the second slip ring 42.

Figure 8:
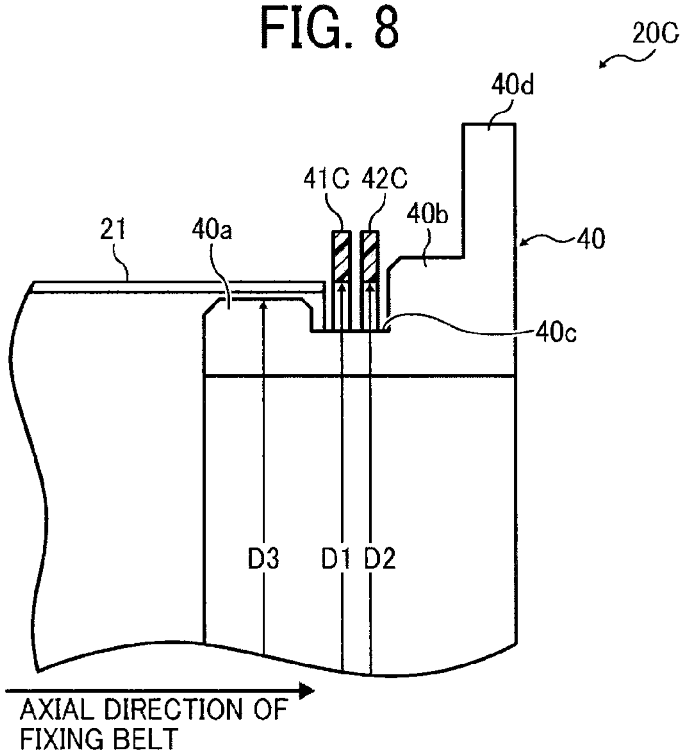
FIG. 8 is a partial horizontal sectional view of a comparative fixing device.

FIG. 8 is a partial horizontal sectional view of a comparative fixing device 20C incorporating a comparative first slip ring 41C and a comparative second slip ring 42C having the inner diameters D1 and D2 that are greater than the outer diameter D3 of the belt support 40*a*. The greater inner diameters D1 and D2 of the comparative first slip ring 41C and the comparative second slip ring 42C, respectively, facilitate insertion of the comparative first slip ring 41C and the comparative second slip ring 42C into the groove 40*c*. However, if the fixing belt 21 is skewed in the axial direction thereof, the fixing belt 21 may enter a through-hole of each of the comparative first slip ring 41C and the comparative second slip ring 42C and come into contact with the regulator 40*b* of the belt holder 40. To address this problem, as shown in FIG. 7, the inner diameter D1 of the first slip ring 41 and the inner diameter D2 of the second slip ring 42 are smaller than the outer diameter D3 of the belt support 40*a*.

However, with the first slip ring 41 and the second slip ring 42 shown in FIG. 7 having the smaller inner diameters D1 and D2, respectively, it is necessary to deform the first slip ring 41 and the second slip ring 42 during insertion thereof into the groove 40*c*. For example, if the first slip ring 41 and the second slip ring 42 are made of a material subject to plastic deformation, once the first slip ring 41 and the second slip ring 42 are deformed during insertion thereof into the groove 40*c*, plastic deformation of the first slip ring 41 and the second slip ring 42, after they are inserted into the groove 40*c*, may obstruct their smooth rotation over the groove 40*c* or disable their rotation completely. If the first slip ring 41 and the second slip ring 42 do not rotate smoothly, even when the lateral edge 21*a* of the fixing belt 21 comes into contact with the first slip ring 41, the first slip ring 41 and the second slip ring 42 do not rotate in accordance with rotation of the fixing belt 21, imposing an increased load to the lateral end 21*b* of the fixing belt 21.

For example, if the first slip ring 41 and the second slip ring 42 are made of fluoroplastic, such as PTFE, that has a friction coefficient smaller than that of general heat-resistant resin, fluoroplastic of the first slip ring 41 and the second slip ring 42 decreases resistance between the belt holder 40 and the first slip ring 41 and the second slip ring 42 sliding thereover, thus facilitating rotation of the first slip ring 41 and the second slip ring 42 in accordance with rotation of the fixing belt 21. However, since fluoroplastic is subject to deformation, while the first slip ring 41 and the second slip ring 42 are inserted into the groove 40*c*, they may be deformed into an ellipse that obstructs their rotation in accordance with rotation of the fixing belt 21 after they are attached to the groove 40*c*. Conversely, general heat-resistant resin, such as PEEK, has a friction coefficient greater than that of fluoroplastic but provides an advantage of increased resistance against deformation.

To address these circumstances, according to this exemplary embodiment, the first slip ring 41 and the second slip ring 42 are made of materials described below that provide the advantages of fluoroplastic and general heat-resistant resin. For example, the first slip ring 41 and the second slip ring 42 adjacent to each other are interposed between the fixing belt 21 and the belt holder 40 in the axial direction of the fixing belt 21. The first slip ring 41 situated adjacent to the fixing belt 21 is made of heat-resistant resin, that is, PEEK. Conversely, the second slip ring 42 situated adjacent to the belt holder 40 is made of fluoroplastic, that is, PTFE.

Since the first slip ring 41 is made of PEEK that barely deforms, even if the first slip ring 41 is attached to or hung on the groove 40*c*, it is rotatable smoothly. Conversely, since the second slip ring 42 is made of deformable PTFE, as the second slip ring 42 is attached to or hung on the groove 40*c*, it is deformed and thereby may not be rotatable smoothly. However, even if the deformed second slip ring 42 is not rotatable smoothly, since the low friction second slip ring 42 is interposed between the first slip ring 41 and the belt holder 40, the first slip ring 41 is rotatable readily. Accordingly, even if the fixing belt 21, as it rotates, is skewed in the axial direction thereof and is brought into contact with the first slip ring 41, the first slip ring 41 rotates smoothly in accordance with rotation of the fixing belt 21, decreasing load imposed on the lateral end 21*b* of the fixing belt 21 in the axial direction thereof.

Figure 9:
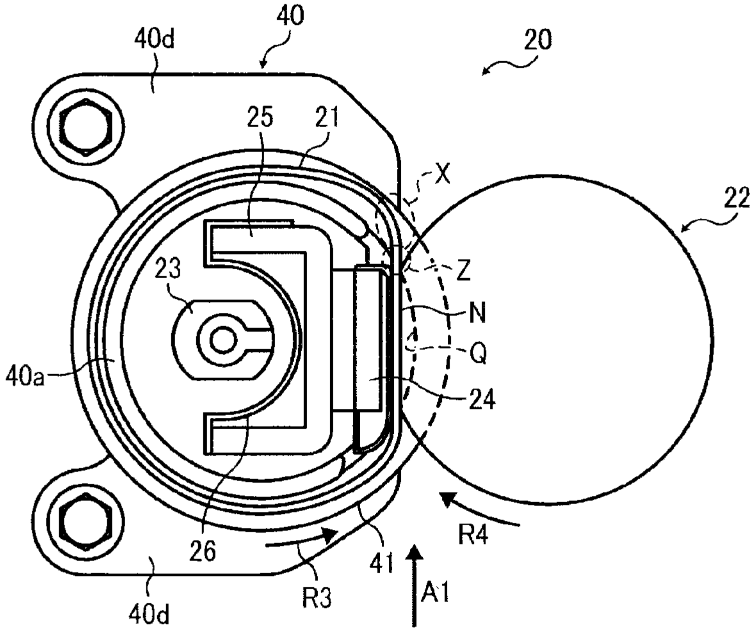
FIG. 9 is a vertical sectional view of the fixing device shown in FIG. 6A illustrating a rotation locus of the fixing belt and a first slip ring incorporated in the fixing device.

With reference to FIG. 9, a description is provided of a rotation locus of the fixing belt 21 that rotates in the rotation direction R3.

FIG. 9 is a vertical sectional view of the fixing device 20 illustrating the fixing belt 21. As shown in FIG. 9, the pressing roller 22 presses the fixing belt 21 against the nip formation assembly 24 situated inside the loop formed by the fixing belt 21 at the fixing nip N, shaping the fixing belt 21 into a plane there. Conversely, in a region encircled by an ellipse X, that is situated downstream from the fixing nip N in the recording medium conveyance direction A1, the fixing belt 21 bulges slightly outward. That is, the rotation locus of the fixing belt 21 crosses a circumference of the first slip ring 41 in the region indicated by the ellipse X as seen from an axial end of the fixing belt 21. Accordingly, if the first slip ring 41 does not rotate in accordance with rotation of the fixing belt 21 as the lateral edge 21*a* of the fixing belt 21 contacts the first slip ring 41, the first slip ring 41 may be damaged by the lateral edge 21*a* of the fixing belt 21 in the region indicated by the ellipse X. Additionally, in the region indicated by the ellipse X, rotation of the fixing belt 21 obstructs rotation of the first slip ring 41, generating noise from the first slip ring 41.

In order to minimize damage and noise of the first slip ring 41, it is desired to rotate the first slip ring 41 smoothly in accordance with rotation of the fixing belt 21. For example, according to this exemplary embodiment described above, the second slip ring 42 made of low friction fluoroplastic decreases the friction coefficient between the first slip ring 41 and the second slip ring 42, thus facilitating rotation of the first slip ring 41 in accordance with rotation of the fixing belt 21. Conversely, the first slip ring 41 made of general heat-resistant resin increases the friction coefficient between the first slip ring 41 and the fixing belt 21, thus facilitating precise rotation of the first slip ring 41 in accordance with rotation of the fixing belt 21. That is, the friction coefficient between the first slip ring 41 and the second slip ring 42 is smaller than that between the first slip ring 41 and the fixing belt 21. Accordingly, the first slip ring 41 rotates in accordance with rotation of the fixing belt 21 smoothly, minimizing damage to the first slip ring 41 that may be caused by the fixing belt 21 sliding thereover in the region indicated by the ellipse X and noise that may be generated by the fixing belt 21 obstructing rotation of the first slip ring 41.

Alternatively, in order to facilitate smooth rotation of the first slip ring 41 in accordance with rotation of the fixing belt 21, the surface roughness of the first slip ring 41 and the second slip ring 42 may be adjusted. For example, the surface roughness of the second slip ring 42 is smaller than that of the first slip ring 41. Accordingly, the friction coefficient between the first slip ring 41 and the second slip ring 42 is smaller than that between the first slip ring 41 and the fixing belt 21, facilitating rotation of the first slip ring 41 in accordance with rotation of the fixing belt 21.

Yet alternatively, as shown in FIG. 7, an outer face 41*b* of the first slip ring 41 is disposed opposite an inner face 42*c* of the second slip ring 42. One or both of the outer face 41*b* of the first slip ring 41 and the inner face 42*c* of the second slip ring 42 may be applied with a lubricant such as oil and grease. The lubricant applied between the first slip ring 41 and the second slip ring 42 decreases the friction coefficient between the first slip ring 41 and the second slip ring 42 relative to the friction coefficient between the first slip ring 41 and the fixing belt 21, thus facilitating rotation of the first slip ring 41 in accordance with rotation of the fixing belt 21.

Figure 10:
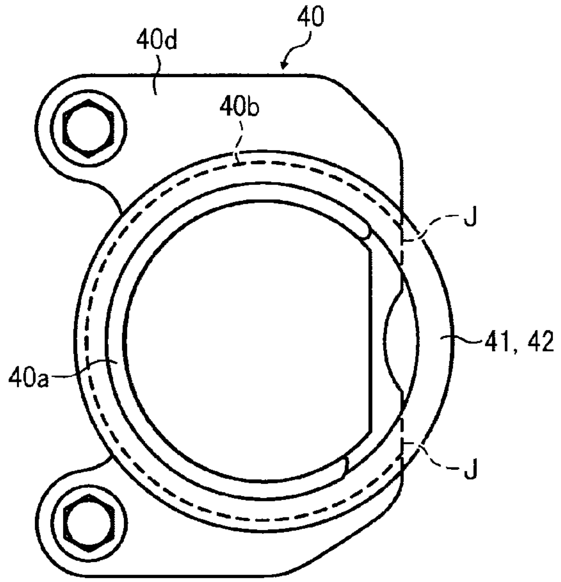
FIG. 10 is a vertical sectional view of a belt holder, the first slip ring, and a second slip ring incorporated in the fixing device shown in FIG. 6A.

With reference to FIG. 10, a detailed description is now given of a configuration of the regulator 40*b* of the belt holder 40.

FIG. 10 is a vertical sectional view of the belt holder 40. As shown in FIG. 10, the regulator 40*b* of the belt holder 40 is not disposed opposite the entire circumference of the first slip ring 41 and the second slip ring 42. Accordingly, if the second slip ring 42 is brought into contact with the regulator 40*b* as the fixing belt 21 skewed in the axial direction thereof presses the first slip ring 41 and the second slip ring 42 against the regulator 40*b*, the regulator 40*b* does not support the first slip ring 41 and the second slip ring 42 throughout their entire circumference. Consequently, as the skewed fixing belt 21 presses the first slip ring 41 and the second slip ring 42 against the regulator 40*b*, the first slip ring 41 and the second slip ring 42 may be bent or deformed at edges J of the regulator 40*b*. As a result, deformation of the first slip ring 41 and the second slip ring 42 may increase resistance between the fixing belt 21, the first slip ring 41, and the second slip ring 42, thus obstructing rotation of the first slip ring 41 and the second slip ring 42 in accordance with rotation of the fixing belt 21.

Figure 11:
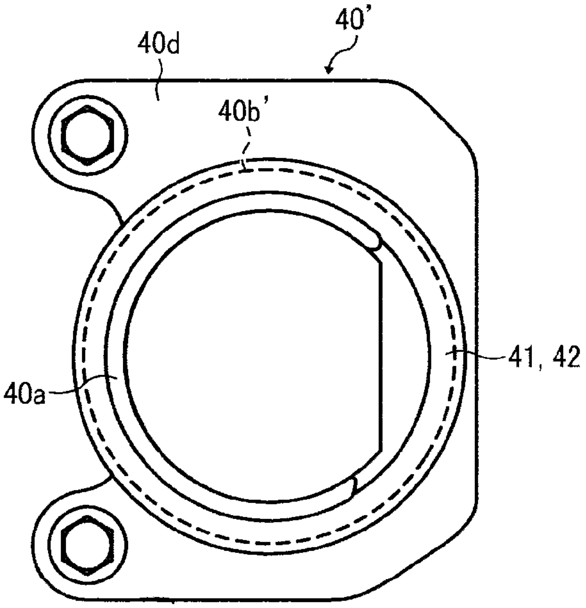
FIG. 11 is a vertical sectional view of an alternative belt holder installable in the fixing device shown in FIG. 6A.

To address this problem, that is, to minimize deformation of the first slip ring 41 and the second slip ring 42, as shown in FIG. 11, a circular regulator 40*b*' disposed opposite the entire circumference of the first slip ring 41 and the second slip ring 42 may be employed instead of the substantially C-shaped regulator 40*b* depicted in FIG. 10. FIG. 11 is a vertical sectional view of a belt holder 40' incorporating the circular regulator 40*b*'. As shown in FIG. 11, the circular regulator 40*b*' is disposed opposite the entire circumference of the first slip ring 41 and the second slip ring 42. Accordingly, even if the skewed fixing belt 21 presses the first slip ring 41 and the second slip ring 42 against the regulator 40*b*', the regulator 40*b*' supports the first slip ring 41 and the second slip ring 42 throughout the entire circumference thereof, thus minimizing deformation of the first slip ring 41 and the second slip ring 42 and thereby stabilizing the attitude of the first slip ring 41 and the second slip ring 42. Accordingly, resistance of the regulator 40*b*' against the first slip ring 41 and the second slip ring 42 that slide over the regulator 40*b*' is decreased, facilitating rotation of the first slip ring 41 and the second slip ring 42 in accordance with rotation of the fixing belt 21.

The first slip ring 41 adjacent to the fixing belt 21 is made of a material that is more rigid than a material of the second slip ring 42 adjacent to the belt holder 40', thus minimizing deformation of the first slip ring 41. Accordingly, even if the skewed fixing belt 21 presses the first slip ring 41 against the regulator 40*b*' of the belt holder 40', the first slip ring 41 is barely deformed, retaining and stabilizing its shape and attitude and thereby facilitating rotation of the first slip ring 41 in accordance with rotation of the fixing belt 21.

As shown in FIG. 9, as the pressing roller 22 presses the fixing belt 21 against the nip formation assembly 24 at the fixing nip N, the fixing belt 21 is situated inward from an inner circumferential surface Q of each of the first slip ring 41 and the second slip ring 42 at a region indicated by an ellipse Z that is disposed in proximity to and downstream from the fixing nip N in the recording medium conveyance direction A1. The fixing belt 21 situated inward from the inner circumferential surface Q of each of the first slip ring 41 and the second slip ring 42, as it rotates, presses the inner circumferential surface Q of each of the first slip ring 41 and the second slip ring 42 radially, enlarging the first slip ring 41 and the second slip ring 42 in the region indicated by the ellipse Z radially over time. Accordingly, if the fixing belt 21 is skewed in the axial direction thereof, it may move into a through-hole of each of the first slip ring 41 and the second slip ring 42. Eventually, the lateral edge 21*a* of the fixing belt 21 may come into contact with the belt holder 40 or the fixing belt 21 may be twisted, imposing load to the lateral end 21*b* of the fixing belt 21 that may cause damage and abrasion of the fixing belt 21.

Figure 12:
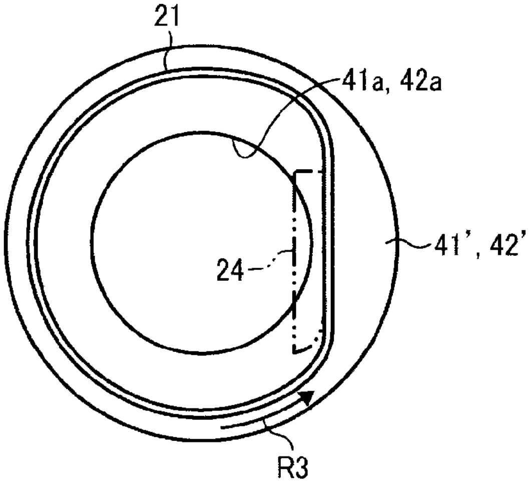
FIG. 12 is a vertical sectional view of an alternative first slip ring and an alternative second slip ring installable in the fixing device shown in FIG. 6A.

To address this problem, as shown in FIG. 12, a first slip ring 41' and a second slip ring 42' having inner circumferential surfaces 41*a* and 42*a*, respectively, that are situated inward from the rotation locus of the fixing belt 21 may be employed instead of the first slip ring 41 and the second slip ring 42 depicted in FIG. 11. FIG. 12 is a vertical sectional view of the first slip ring 41' and the second slip ring 42'. As shown in FIG. 12, the inner circumferential surfaces 41*a* and 42*a* of the first slip ring 41' and the second slip ring 42' are situated inside the rotation locus of the fixing belt 21. For example, since the fixing belt 21 may swing or vibrate as it rotates in the rotation direction R3, the rotation locus of the fixing belt 21 may vary. To address this circumstance, the inner circumferential surfaces 41*a* and 42*a* of the first slip ring 41' and the second slip ring 42', respectively, are situated inward from an innermost rotation locus amongst the variable rotation loci of the fixing belt 21. Hence, the fixing belt 21 may not move into a through-hole of each of the first slip ring 41' and the second slip ring 42' that is produced by the inner circumferential surfaces 41*a* and 42*a* thereof, thus minimizing damage and abrasion of the fixing belt 21 effectively.

Alternatively, one of the inner circumferential surfaces 41*a* and 42*a* of the first slip ring 41' and the second slip ring 42', respectively, may be situated inward from the rotation locus of the fixing belt 21. Since one of the inner circumferential surfaces 41*a* and 42*a* of the first slip ring 41' and the second slip ring 42', respectively, prohibits the fixing belt 21 from moving into the through-hole of the one of the first slip ring 41' and the second slip ring 42', damage and abrasion of the fixing belt 21 are minimized.

Figure 13:
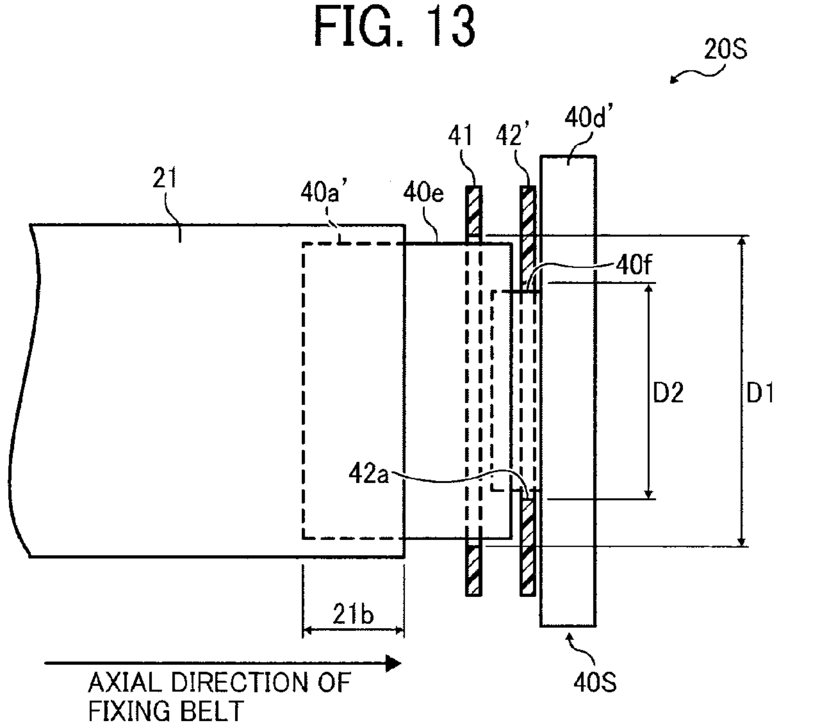
FIG. 13 is a partial horizontal sectional view of a fixing device according to a second exemplary embodiment of the present invention.

With reference to FIG. 13, a description is provided of a configuration in which only the inner circumferential surface 42*a* of the second slip ring 42' is situated inward from the rotation locus of the fixing belt 21.

FIG. 13 is a partial horizontal sectional view of a fixing device 20S according to a second exemplary embodiment that incorporates the second slip ring 42'. As shown in FIG. 13, the inner diameter D2 of the second slip ring 42' is smaller than the inner diameter D1 of the first slip ring 41. The inner circumferential surface 42*a* of the second slip ring 42' is situated inward from the rotation locus of the fixing belt 21.

The fixing device 20S includes a belt holder 40S instead of the belt holder 40 depicted in FIG. 7. For example, the belt holder 40S includes a substantially tubular, belt support 40*a*' disposed opposite the inner circumferential surface of the fixing belt 21 at the lateral end 21*b* of the fixing belt 21 in the axial direction thereof and having an outer diameter equivalent to an inner loop diameter of the fixing belt 21; a substantially tubular, great-diameter support 40*e* contiguous to the belt support 40*a*' and having an outer diameter equivalent to the inner loop diameter of the fixing belt 21; a substantially tubular, small-diameter support 40*f* adjacent to the great-diameter support 40*e* and having an outer diameter smaller than that of the great-diameter support 40*e*; and a regulating mount 40*d*' mounting the small-diameter support 40*f*. The first slip ring 41 is rotatably attached to or hung on an outer circumferential surface of the great-diameter support 40*e*; the second slip ring 42' is rotatably attached to or hung on an outer circumferential surface of the small-diameter support 40*f*. Thus, the great-diameter support 40*e* serves as a first protection ring support having the outer diameter that is equivalent to the inner loop diameter of the fixing belt 21 and contacting and rotatably supporting the first slip ring 41. The small-diameter support 40*f* serves as a second protection ring support being smaller than the great-diameter support 40*e* in outer diameter and contacting and rotatably supporting the second slip ring 42'.

The small-diameter support 40*f* engages the interior (e.g., an inner circumferential surface) of the great-diameter support 40*e* or is detachably attached to the great-diameter support 40*e*. In order to attach the first slip ring 41 and the second slip ring 42' to the belt holder 40S, the first slip ring 41 is attached to the great-diameter support 40*e* and the second slip ring 42' is attached to the small-diameter support 40*f*. Then, the small-diameter support 40*f* engages the great-diameter support 40*e*. Since the inner diameter D2 of the second slip ring 42' of the fixing device 20S is smaller than the inner diameter D2 of the second slip ring 42 of the fixing device 20 shown in FIG. 7, if the great-diameter support 40*e* is configured to be unseparatably combined with the small-diameter support 40*f*, the second slip ring 42' cannot move across the great-diameter support 40*e* such that the second slip ring 42' slides over the outer circumferential surface of the great-diameter support 40*e* before the second slip ring 42' is attached to the small-diameter support 40*f*. To address this circumstance, according to this exemplary embodiment, the small-diameter support 40*f* is separatable from the great-diameter support 40*e*. Accordingly, it is not necessary to move the second slip ring 42' across the great-diameter support 40*e*, that is, to slide the second slip ring 42' over the outer circumferential surface of the great-diameter support 40*e*, facilitating attachment of the second slip ring 42' to the belt holder 40S.

Figure 14:
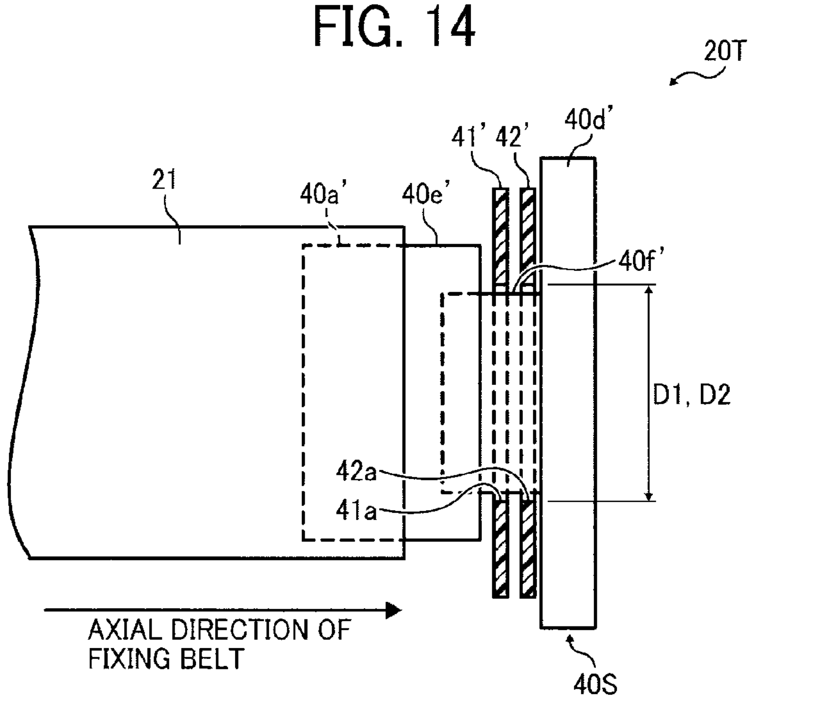
FIG. 14 is a partial horizontal sectional view of a fixing device according to a third exemplary embodiment of the present invention.

With reference to FIG. 14, a description is provided of a configuration in which both the inner circumferential surface 41*a* of the first slip ring 41' and the inner circumferential surface 42*a* of the second slip ring 42' are situated inward from the rotation locus of the fixing belt 21.

FIG. 14 is a partial horizontal sectional view of a fixing device 20T according to a third exemplary embodiment that incorporates the first slip ring 41' and the second slip ring 42'. As shown in FIG. 14, both the first slip ring 41' and the second slip ring 42' are rotatably attached to or hung on an outer circumferential surface of a small-diameter support 40*f'*. Since the small-diameter support 40*f'* supports both the first slip ring 41' and the second slip ring 42', the small-diameter support 40*f'* may have a width greater than that of the small-diameter support 40*f* depicted in FIG. 13 in the axial direction of the fixing belt 21. Conversely, since the great-diameter support 40*e'* supports neither the first slip ring 41' nor the second slip ring 42', the great-diameter support 40*e'* may have a width smaller than that of the great-diameter support 40*e* depicted in FIG. 13 in the axial direction of the fixing belt 21. Thus, the small-diameter support 40*f'* serves as a second protection ring support being smaller than the great-diameter support 40*e'* in outer diameter and contacting and rotatably supporting the first slip ring 41' and the second slip ring 42'. Like the small-diameter support 40*f* depicted in FIG. 13, the small-diameter support 40*f* is separatable from the great-diameter support 40*e'*. Accordingly, it is not necessary to move the first slip ring 41' and the second slip ring 42' across the great-diameter support 40*e'*, that is, to slide the first slip ring 41' and the second slip ring 42' over an outer circumferential surface of the great-diameter support 40*e'*, facilitating attachment of both the first slip ring 41' and the second slip ring 42' to the belt holder 40S.

Figure 15:
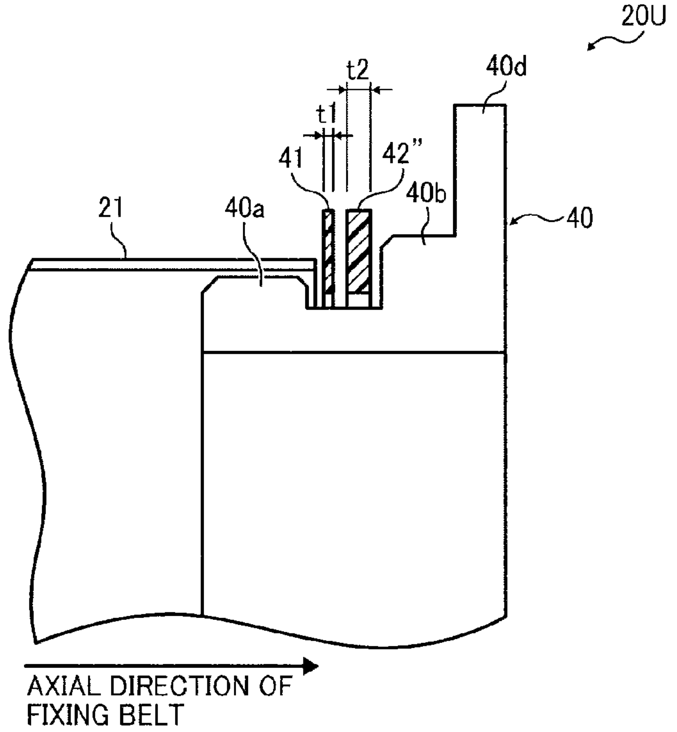
FIG. 15 is a partial horizontal sectional view of a fixing device according to a fourth exemplary embodiment of the present invention.

With reference to FIG. 15, a description is provided of a configuration of a fixing device 20U according to a fourth exemplary embodiment that incorporates a second slip ring 42" thicker than the first slip ring 41.

FIG. 15 is a partial horizontal sectional view of the fixing device 20U. As shown in FIG. 15, unlike the second slip ring 42 depicted in FIG. 7, the second slip ring 42" has a thickness t2 that is greater than a thickness t1 of the first slip ring 41 in the axial direction of the fixing belt 21. It is preferable that the first slip ring 41 and the second slip ring 42" rotate in accordance with rotation of the fixing belt 21. However, the rotation speed of the fixing belt 21 may differ from the rotation speed of the first slip ring 41 and the second slip ring 42". In this case, friction between the fixing belt 21 and the first slip ring 41 may increase, resulting in damage and abrasion of the first slip ring 41. To address this circumstance, according to this exemplary embodiment, the second slip ring 42" has the thickness t2 that is greater than the thickness t1 of the first slip ring 41. The greater thickness t2 of the second slip ring 42" increases the weight of the second slip ring 42", hindering rotation of the second slip ring 42" and thereby minimizing rotation of the second slip ring 42" in accordance with rotation of the fixing belt 21. As a result, in contrast to the second slip ring 42", the first slip ring 41 rotates in accordance with rotation of the fixing belt 21 readily.

With reference to FIGS. 7 and 9 to 15, a description is provided of advantages of the first slip ring (e.g., the first slip rings 41 and 41') and the second slip ring (e.g., the second slip rings 42, 42', and 42").

The fixing device (e.g., the fixing devices 20, 20S, 20T, and 20U) includes the fixing belt 21 serving as an endless belt rotatable in the predetermined direction of rotation R3; at least one halogen heater 23 serving as a heater that heats the fixing belt 21; the nip formation assembly 24 disposed inside the loop formed by the fixing belt 21; the pressing roller 22 serving as an opposed rotary body pressed against the nip formation assembly 24 via the fixing belt 21 to form the fixing nip N between the pressing roller 22 and the fixing belt 21; the belt holder (e.g., the belt holders 40 and 40S) contacting and rotatably supporting each lateral end 21*b* of the fixing belt 21 in the axial direction thereof; the first protection ring (e.g., the first slip rings 41 and 41') contactably disposed adjacent to each lateral end 21*b* of the fixing belt 21 in the axial direction thereof; and the second protection ring (e.g., the second slip rings 42, 42', and 42") contactably disposed adjacent to the first protection ring in the axial direction of the fixing belt 21. The first protection ring and the second protection ring are interposed between the lateral end 21*b* of the fixing belt 21 and the belt holder in the axial direction of the fixing belt 21 to protect the lateral end 21*b* of the fixing belt 21. The friction coefficient between the first protection ring and the second protection ring is smaller than that between the first protection ring and the fixing belt 21.

Accordingly, the first protection ring rotates in accordance with rotation of the fixing belt 21 readily, minimizing damage and abrasion of the lateral end 21*b* of the fixing belt 21 and thereby improving durability of the fixing belt 21.

The friction coefficient between the first slip ring and the second slip ring is smaller than the friction coefficient between the first slip ring and the fixing belt 21, thus facilitating rotation of the first slip ring in accordance with rotation of the fixing belt 21. Accordingly, damage and abrasion of the lateral end 21*b* of the fixing belt 21 and the first slip ring are minimized, improving durability of the fixing belt 21 and the first slip ring.

For example, the fixing belt 21 having a reduced thickness that decreases the thermal capacity thereof has a decreased mechanical strength. To address this problem, the first slip ring and the second slip ring according to the exemplary embodiments described above minimize damage and abrasion of the fixing belt 21.

Conventionally, a single slip ring is interposed between the fixing belt 21 and the belt holder 40 in the axial direction of the fixing belt 21. If the slip ring has a decreased thickness, it may be deformed as it receives pressure from the fixing belt 21 as the fixing belt 21 is skewed accidentally in the axial direction thereof. In order to minimize deformation of the slip ring, the slip ring may have an increased thickness that is durable against pressure from the fixing belt 21 skewed in the axial direction thereof. However, the increased thickness of the slip ring increases the weight thereof and the area where the slip ring slides over the belt holder, thus obstructing rotation of the slip ring in accordance with rotation of the fixing belt 21.

To address this problem, according to the exemplary embodiments described above, the two slip rings, that is, the first slip ring and the second slip ring, are disposed adjacent to each other between the fixing belt 21 and the belt holder in the axial direction of the fixing belt 21. The first slip ring and the second slip ring, compared to the conventional single slip ring, improve durability against pressure from the fixing belt 21 skewed in the axial direction thereof, reducing deformation of the first slip ring and the second slip ring by pressure from the fixing belt 21. Additionally, it is not necessary to increase the thickness of each of the first slip ring and the second slip ring, facilitating rotation of the first slip ring and the second slip ring in accordance with rotation of the fixing belt 21. That is, durability of the first slip ring and the second slip ring improves without deteriorating rotation of the first slip ring and the second slip ring in accordance with rotation of the fixing belt 21, thus minimizing damage and abrasion of the lateral end 21*b* of the fixing belt 21, the first slip ring, and the second slip ring.

The first slip ring is made of heat-resistant resin durable against deformation. Conversely, the second slip ring is made of low friction fluoroplastic. Accordingly, even if it is difficult to attach the first slip ring and the second slip ring to the belt holder, the first slip ring is attached to the belt holder with minimized deformation, thus facilitating rotation of the first slip ring and the second slip ring in accordance with rotation of the fixing belt 21.

The first slip ring is made of heat-resistant resin such as PEEK. The second slip ring is made of fluoroplastic such as PTFE. Alternatively, the first slip ring and the second slip ring may be made of other materials, that is, other heat-resistant resin and fluoroplastic, respectively. For example, the first slip ring may be made of heat-resistant resin such as PPS and PAI. The second slip ring may be made of fluoroplastic such as PFA and FEP.

The exemplary embodiments described above provide various methods for facilitating rotation of the first slip ring in accordance with rotation of the fixing belt 21: reducing the surface roughness of the second slip ring; applying the lubricant between the first slip ring and the second slip ring; producing the first slip ring with a rigid material; and increasing the thickness of the second slip ring. Alternatively, any two or more of these methods may be combined.

In order to prevent the fixing belt 21 from entering the through-hole of each of the first slip ring and the second slip ring, at least one of the inner circumferential surface of the first slip ring and the inner circumferential surface of the second slip ring is situated inward from the rotation locus of the fixing belt 21. Accordingly, the fixing belt 21 does not enter the through-hole of each of the first slip ring and the second slip ring, minimizing damage and abrasion of the lateral end 21*b* of the fixing belt 21 effectively.

The present invention is not limited to the details of the exemplary embodiments described above, and various modifications and improvements are possible. For example, according to the exemplary embodiments described above, the two slip rings, that is, the first slip ring and the second slip ring, are situated at each lateral end of the fixing belt 21 in the axial direction thereof. Alternatively, three or more slip rings may be interposed between the fixing belt 21 and the belt holder.

Figure 16:
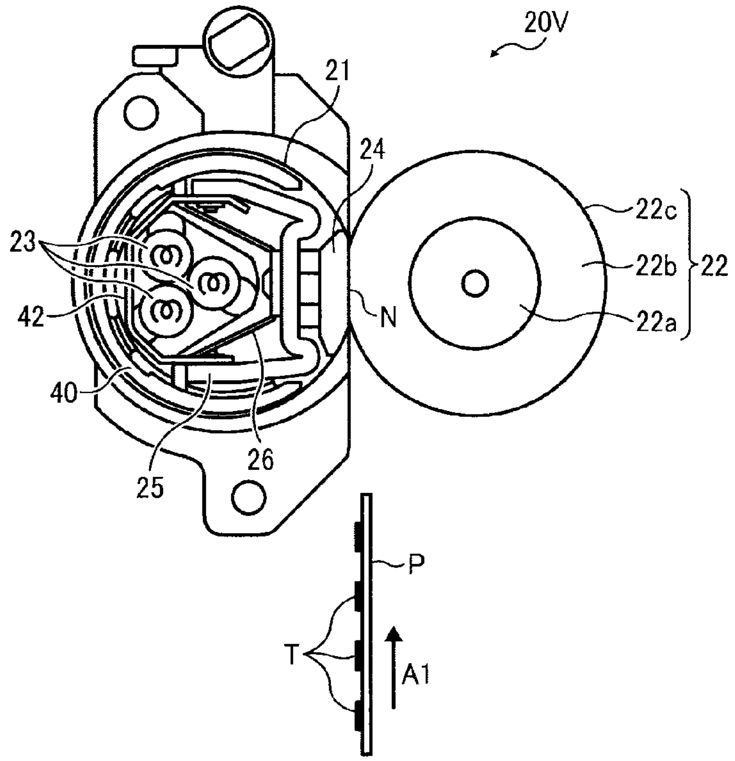
FIG. 16 is a partial vertical sectional view of a fixing device according to a fifth exemplary embodiment of the present invention.

The first slip ring and the second slip ring according to the exemplary embodiments described above may be incorporated in other fixing devices, for example, a fixing device 20V according to a fifth exemplary embodiment that incorporates a plurality of halogen heaters 23 as shown in FIG. 16.

FIG. 16 is a vertical sectional view of the fixing device 20V. As shown in FIG. 16, the fixing device 20V includes three halogen heaters 23. The three halogen heaters 23 have three different regions thereof in the axial direction of the fixing belt 21 that generate heat. Accordingly, the three halogen heaters 23 heat the fixing belt 21 in three different regions on the fixing belt 21, respectively, in the axial direction thereof so that the fixing belt 21 heats recording media P of various widths in the axial direction of the fixing belt 21.

Additionally, as shown in FIG. 4, the image forming apparatus 1 incorporating the fixing device 20, 20S, 20T, 20U, or 20V is a color laser printer. Alternatively, the image forming apparatus 1 may be a monochrome printer, a copier, a facsimile machine, a multifunction printer (MFP) having at least one of copying, printing, facsimile, and scanning functions, or the like.

According to the exemplary embodiments described above, the pressing roller 22 serves as an opposed rotary body disposed opposite the fixing belt 21 serving as an endless belt. Alternatively, a pressing belt or the like may serve as an opposed rotary body.

The present invention has been described above with reference to specific exemplary embodiments. Note that the present invention is not limited to the details of the embodiments described above, but various modifications and enhancements are possible without departing from the spirit and scope of the invention. It is therefore to be understood that the present invention may be practiced otherwise than as specifically described herein. For example, elements and/or features of different illustrative exemplary embodiments may be combined with each other and/or substituted for each other within the scope of the present invention.

What is claimed is:

1. A fixing device comprising:

an endless belt rotatable in a predetermined direction of rotation;

a belt holder contacting and rotatably supporting each lateral end of the endless belt in an axial direction thereof;

a first protection ring contactably disposed adjacent to each lateral end of the endless belt in the axial direction thereof; and a second protection ring contactably disposed adjacent to the first protection ring in the axial direction of the endless belt, the first protection ring and the second protection ring interposed between the endless belt and the belt holder in the axial direction of the endless belt and rotatable in accordance with rotation of the endless belt to protect each lateral end of the endless belt as the endless belt is skewed in the axial direction thereof and brought into contact with the first protection ring, wherein a friction coefficient between the first protection ring and the second protection ring is smaller than a friction coefficient between the first protection ring and the endless belt.

2. The fixing device according to claim 1, wherein the first protection ring is made of heat-resistant resin and the second protection ring is made of fluoroplastic having a friction coefficient smaller than a friction coefficient of the heat-resistant resin.

3. The fixing device according to claim 1, wherein a surface roughness of the second protection ring is smaller than a surface roughness of the first protection ring.

4. The fixing device according to claim 1, wherein a lubricant is applied between the first protection ring and the second protection ring.

5. The fixing device according to claim 1, wherein the second protection ring is thicker than the first protection ring.

6. The fixing device according to claim 1, wherein the second protection ring is more rigid than the first protection ring.

7. The fixing device according to claim 1, wherein the belt holder includes:

a substantially tubular, belt support disposed opposite an inner circumferential surface of the endless belt to contact and support the endless belt; and a substantially tubular groove disposed outboard and contiguous to the belt support in the axial direction of the endless belt and having an outer diameter smaller than an outer diameter of the belt support, the groove contacting and rotatably supporting the first protection ring and the second protection ring, and wherein the outer diameter of the belt support is greater than an inner diameter of the first protection ring and the second protection ring.

8. The fixing device according to claim 7, wherein the inner diameter of the first protection ring and the second protection ring is enlarged to cause the first protection ring and the second protection ring to move across the belt support onto the groove in the axial direction of the endless belt for attachment of the first protection ring and the second protection ring onto the groove.

9. The fixing device according to claim 7, wherein the belt holder further includes a substantially tubular regulator disposed outboard from the groove in the axial direction of the endless belt and having an outer diameter greater than the outer diameter of the groove, and wherein as the endless belt is skewed in the axial direction thereof, the endless belt presses the first protection ring and the second protection ring against the regulator.

10. The fixing device according to claim 9, wherein the regulator is substantially C-shaped in cross-section.

11. The fixing device according to claim 9, wherein the regulator is circular in cross-section.

12. The fixing device according to claim 9, wherein the belt holder further includes a mount disposed outboard from the regulator in the axial direction of the endless belt and mounting the regulator.

13. The fixing device according to claim 1, wherein the belt holder includes:

a substantially tubular, belt support disposed opposite an inner circumferential surface of the endless belt to contact and support the endless belt;

a substantially tubular, first protection ring support disposed outboard and contiguous to the belt support in the axial direction of the endless belt, the first protection ring support having an outer diameter that is equivalent to an inner loop diameter of the endless belt; and a substantially tubular, second protection ring support disposed outboard from and contiguous to the first protection ring support in the axial direction of the endless belt, the second protection ring support having an outer diameter smaller than the outer diameter of the first protection ring support.

14. The fixing device according to claim 13, wherein an inner diameter of the first protection ring is greater than an inner diameter of the second protection ring, and wherein the first protection ring support contacts and rotatably supports the first protection ring and the second protection ring support contacts and rotatably supports the second protection ring.

15. The fixing device according to claim 14, wherein the belt holder further includes a mount disposed outboard from the second protection ring support in the axial direction of the endless belt and mounting the second protection ring support, and wherein as the endless belt is skewed in the axial direction thereof, the endless belt presses the first protection ring and the second protection ring against the mount.

16. The fixing device according to claim 13, wherein an inner diameter of the first protection ring is equivalent to an inner diameter of the second protection ring, and wherein the second protection ring support contacts and rotatably supports the first protection ring and the second protection ring.

17. The fixing device according to claim 16, wherein the belt holder further includes a mount disposed outboard from the second protection ring support in the axial direction of the endless belt and mounting the second protection ring support, and wherein as the endless belt is skewed in the axial direction thereof, the endless belt presses the first protection ring and the second protection ring against the mount.

18. The fixing device according to claim 1, further comprising:

at least one heater disposed opposite the endless belt to heat the endless belt;

an opposed rotary body contacting an outer circumferential surface of the endless belt; and a nip formation assembly pressing against the opposed rotary body via the endless belt to form a fixing nip between the opposed rotary body and the endless belt.

19. The fixing device according to claim 18, wherein the at least one heater includes a halogen heater and the opposed rotary body includes a pressing roller.

20. An image forming apparatus comprising the fixing device according to claim 1.

* * * * *